United States Patent
Ueda

(10) Patent No.: US 6,714,314 B1
(45) Date of Patent: Mar. 30, 2004

(54) PHOTOGRAPHIC PRINT PRODUCING SYSTEM

(75) Inventor: Yutaka Ueda, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/425,981

(22) Filed: Oct. 25, 1999

(30) Foreign Application Priority Data

Oct. 30, 1998 (JP) .......................... 10-324426
Oct. 30, 1998 (JP) .......................... 10-324427
Oct. 30, 1998 (JP) .......................... 10-324428

(51) Int. Cl.[7] .......................... G06F 15/00; G06K 1/00
(52) U.S. Cl. .................. 358/1.15; 358/296; 358/302; 358/1.1; 358/1.13; 358/1.15; 358/1.9; 358/3.31; 396/2
(58) Field of Search .................. 358/296, 302, 358/1.9, 3.31, 1.1, 1.13, 1.15; 396/2

(56) References Cited

U.S. PATENT DOCUMENTS 5,608,542 A * 3/1997 Krahe et al. ............... 358/449
5,878,198 A * 3/1999 Yuasa et al. ................ 358/1.18
6,278,528 B1 * 8/2001 Ohtsuka et al. ............ 358/1.15
6,282,330 B1 * 8/2001 Yokota et al. .............. 382/309
6,369,913 B2 * 4/2002 Aoyagi et al. ............... 358/1.9
6,370,280 B1 * 4/2002 Cok et al. ................... 382/284
6,370,568 B1 * 4/2002 Garfinkle .................... 709/206
6,441,921 B1 * 8/2002 Soscia ........................ 358/1.9
6,483,570 B1 * 11/2002 Slater et al. .................. 355/40
6,522,418 B2 * 2/2003 Yokomizo et al. ......... 358/1.15

* cited by examiner

Primary Examiner—Kimberly Williams
Assistant Examiner—Ashanti Ghee
(74) Attorney, Agent, or Firm—Frishauf, Holtz, Goodman & Chick, P.C.

(57) ABSTRACT

In a print system provided with a printer and a first inputting device to input image data and first print service dealing information into the printer; there is further provided a second inputting device to input image data and second print service dealing information different from the first print service dealing information into the printer, and the printer produces a print on the basis of an input from the first inputting device or the second inputting device.

16 Claims, 47 Drawing Sheets

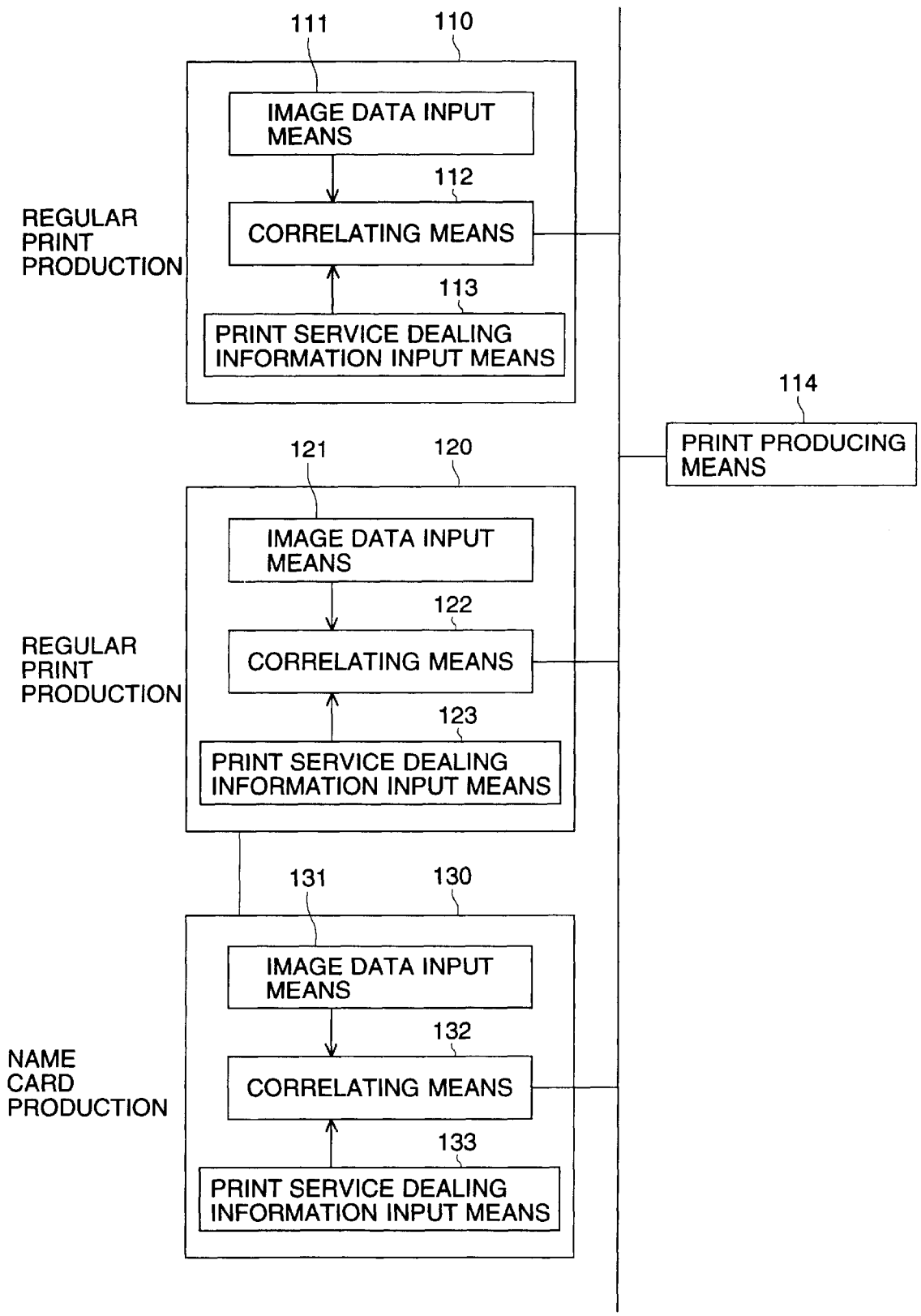

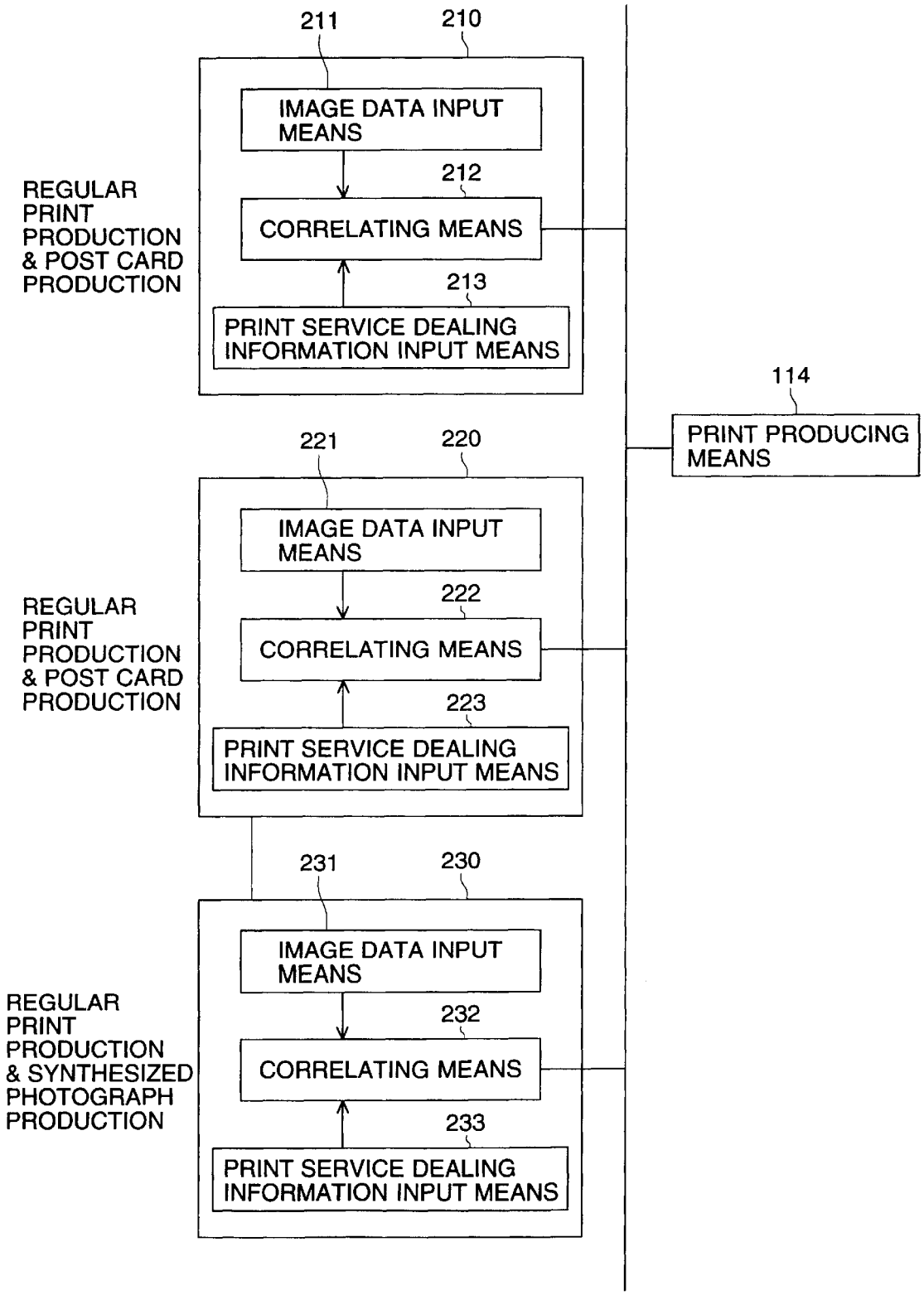

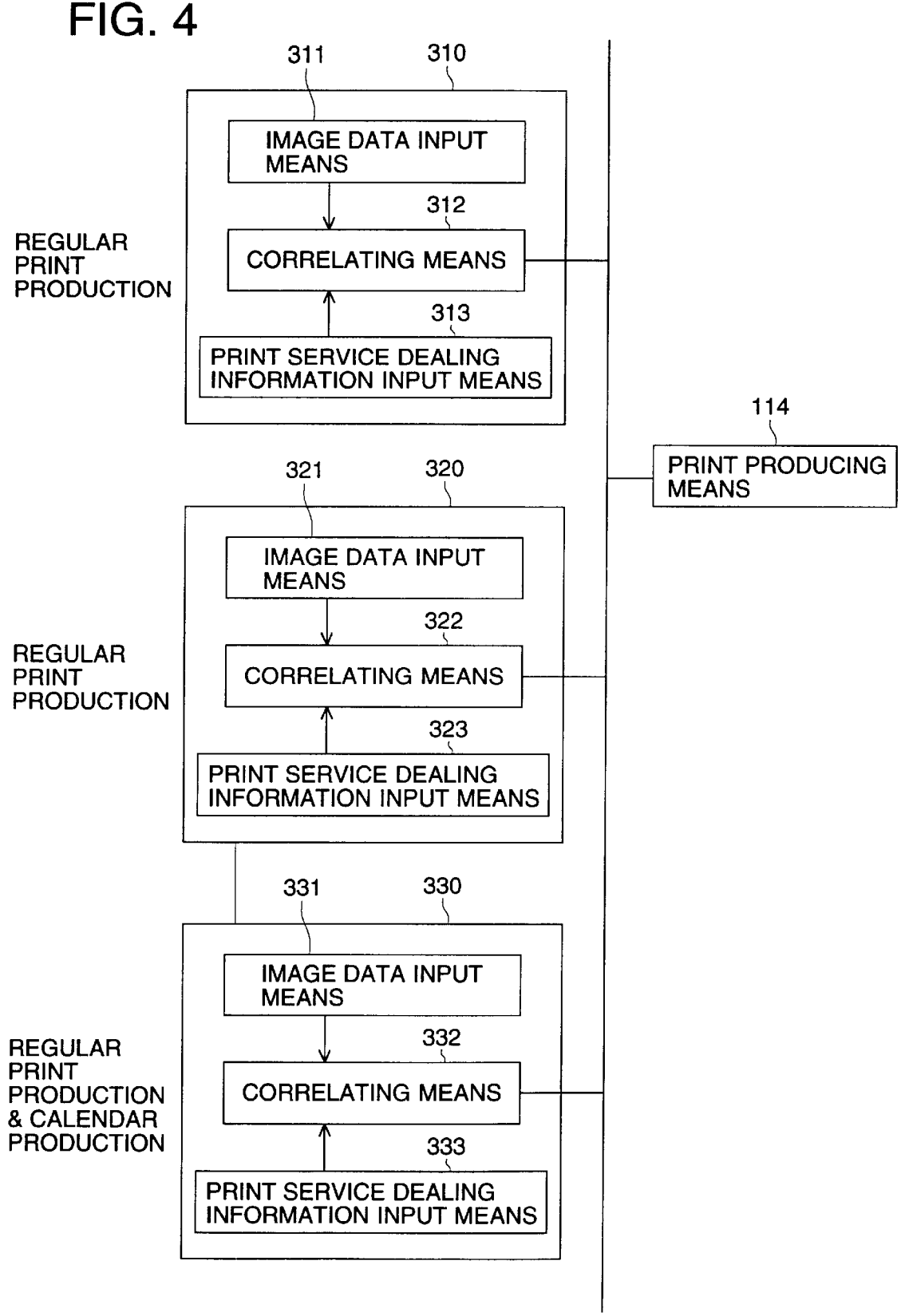

FIG. 20 (a)
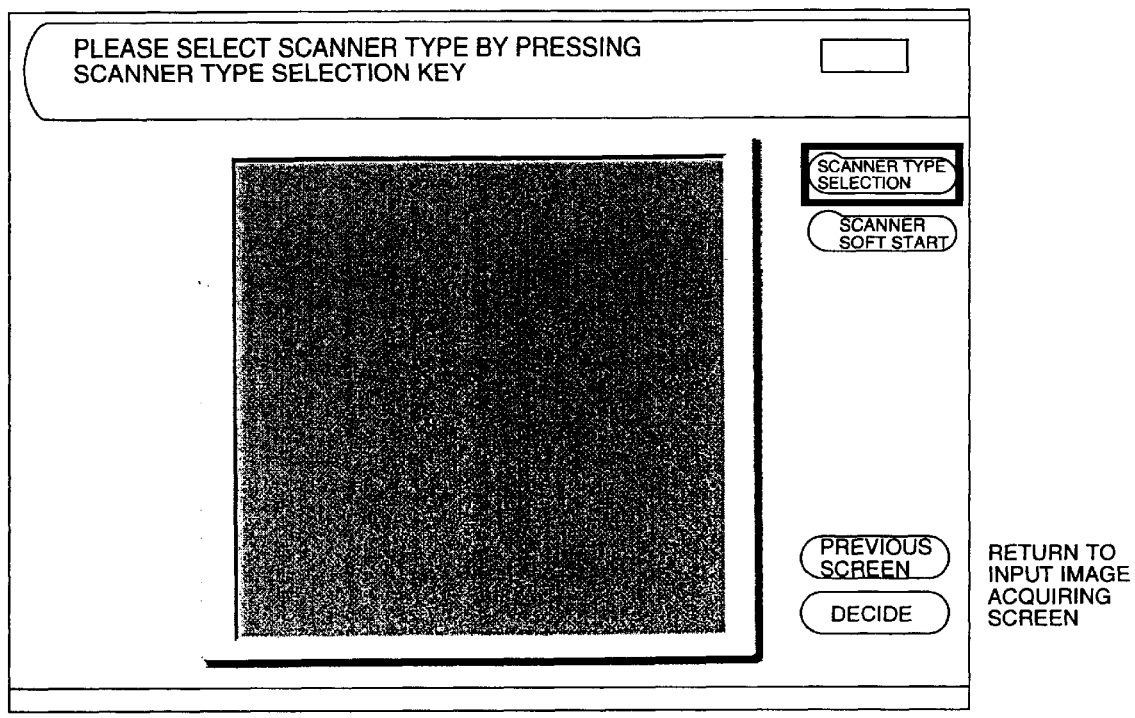
FIG. 20 (b)
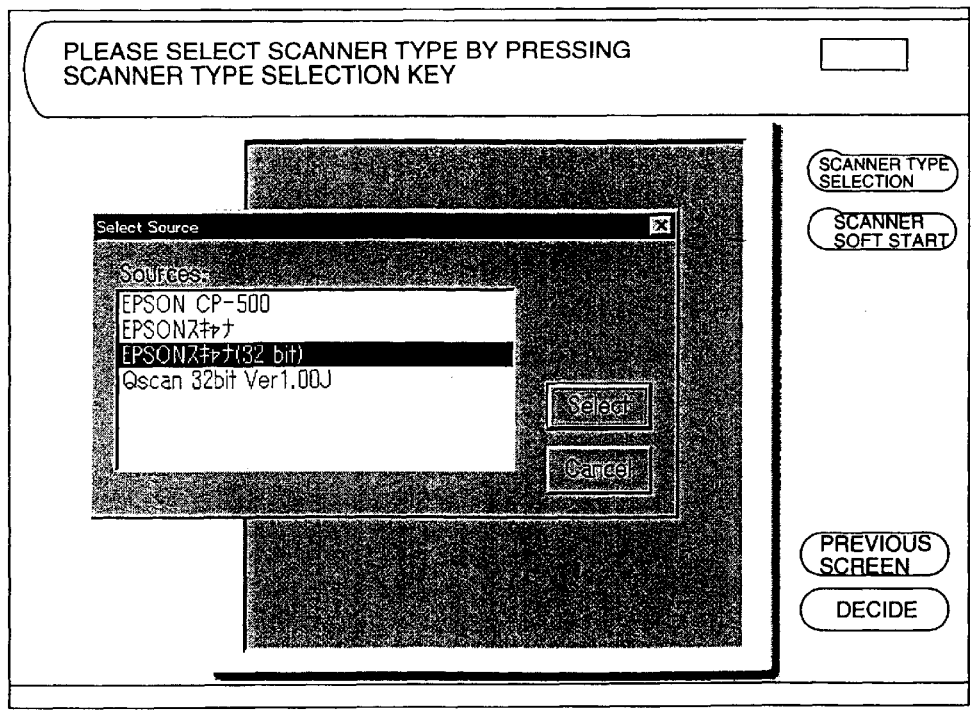

FIG. 44

| | INPUT ORDER INFORMATION | | | | | SERVICE WORKING CONDITION | | |
|---|---|---|---|---|---|---|---|---|
| FOLDER'S NAME | NAME | DATE | TEMPLATE No | PRINT SIZE | NUMBER OF PRINTS | IMAGE INPUT | IMAGE PROCESSING | PRINT |
| AP00001 | YAMADA | 1998/10/05 | KG-01 | 102×152 | 1 | NOT YET | NOT YET | NOT YET |

IMAGE INPUTTING OVER-AGAIN CONFIRMING DIALOGUE

NOW, SELECTED ORDER IS DONE OVER AGAIN FROM INPUTTING STEP SCREEN, DO YOU ALLOW ?

YES    NO

REINPUT IMAGE    REPROCESS IMAGE    REPRINT    PREVIOUS SCREEN    ELIMINATE

FIG. 45

| INPUT ORDER INFORMATION | | | | | | SERVICE WORKING CONDITION | | |
|---|---|---|---|---|---|---|---|---|
| FOLDER'S NAME | NAME | DATE | TEMPLATE No | PRINT SIZE | NUMBER OF PRINTS | IMAGE INPUT | IMAGE PROCESSING | PRINT |
| AP00001 | YAMADA | 1998/10/05 | KG-01 | 102×152 | 1 | NOT YET | NOT YET | NOT YET |

IMAGE INPUTTING OVER-AGAIN CONFIRMING DIALOGUE

NOW, SELECTED ORDER IS DONE OVER AGAIN FROM SYNTHESIZING STEP SCREEN, DO YOU ALLOW?

( YES )  ( NO )

( REINPUT IMAGE )  ( REPROCESS IMAGE )  ( REPRINT )  ( PREVIOUS SCREEN )

( ELIMINATE )

FIG. 46

| INPUT ORDER INFORMATION | | | | | | SERVICE WORKING CONDITION | | |
|---|---|---|---|---|---|---|---|---|
| FOLDER'S NAME | NAME | DATE | TEMPLATE No | PRINT SIZE | NUMBER OF PRINTS | IMAGE INPUT | IMAGE PROCESSING | PRINT |
| AP00001 | YAMADA | 1998/10/05 | KG-01 | 102×152 | 1 | NOT YET | NOT YET | NOT YET |

PRINTING OVER-AGAIN CONFIRMING DIALOGUE

NOW, SELECTED ORDER IS DONE OVER AGAIN FROM PRINTING STEP SCREEN, DO YOU ALLOW ?

YES    NO

REINPUT IMAGE    REPROCESS IMAGE    REPRINT    PREVIOUS SCREEN    ELIMINATE

FIG. 47

| | INPUT ORDER INFORMATION | | | | | SERVICE WORKING CONDITION | | |
|---|---|---|---|---|---|---|---|---|
| FOLDER'S NAME | NAME | DATE | TEMPLATE No | PRINT SIZE | NUMBER OF PRINTS | IMAGE INPUT | IMAGE PROCESSING | PRINT |
| AP00001 | YAMADA | 1998/10/05 | KG-01 | 102×152 | 1 | NOT YET | NOT YET | NOT YET |

ORDER INFORMATION ELIMINATION CONFIRMING DIALOGUE

NOW, SELECTED ORDER IS ELIMINATED, DO YOU ALLOW ?

YES    NO

REINPUT IMAGE    REPROCESS IMAGE    REPRINT    PREVIOUS SCREEN

ELIMINATE

PHOTOGRAPHIC PRINT PRODUCING SYSTEM

BACKGROUND OF THE INVENTION

This invention relates to a photographic print producing system (hereinafter the adjective "photographic" is often omitted for simplicity's sake), and in particular, to a photographic print producing system capable of reading an image from an image scanner to convert it into image data and forming a photographic print of the image as it is or of the image subjected to a predetermined process on the basis of said image data.

It has been heretofore in practice to apply a light to a developed negative-film with an image recorded to print the image recorded on the negative-film on a photographic paper by using the light transmitted by the negative film. Further, in contrast to this, it has been developed a new photographic print producing system which reads an image recorded on a developed negative-film using an image sensor, and after converting the image into image data, prints the image on the basis of said image data.

Incidentally, in the case where images are formed from a large quantity of negative-films in the above-mentioned photographic print producing systems, there has been a thought to make the printing automatic as much as possible by reducing the amount of information to be inputted by the operator in order to reduce the processing time. On the other hand, there has been a thought to cope with the request of processed images without taking time when a person asking for the photographic prints desires it, one reason of which is that image data is actually not so difficult to process. On the basis of such thoughts, in processing image data, there is a possibility that the kinds and quantity of the information to be inputted by the operator become extremely wide-ranging.

Taking these points of problem into consideration, this invention has been done with an object to provide a photographic print producing system capable of producing the mutually opposing demands, which are the demand to make printing automatic and that for increasing the degree of liberty in processing image data, to be compatible.

The above object can be attained by the following system.

A print system, comprises:

a printer;

a first inputting device to input image data and first print service dealing information into the printer; and a second inputting device to input image data and second print service dealing information different from the first print service dealing information into the printer;

the printer producing a print on the basis of an input from the first inputting device or the second inputting device.

Further, the above object may be attained by the following preferable systems.

A photographic print producing system accomplishing the above-mentioned object is a system which makes photographic prints of plural kinds of orders on the basis of image data and print-producing information for producing photographic prints on the basis of said image data, and comprises a correlating device for correlating the inputted image data and the print-producing information for producing photographic prints on the basis of said inputted image data to become corresponding to each other, and a photographic print producing apparatus for producing photographic prints on the basis of said image data and said print-producing information for producing photographic prints on the basis of said image data which are made to be corresponding to each other by said correlating device, and further comprises at least one correlating device to which print-producing information for producing photographic prints of different kinds of orders from the above-mentioned correlating device is inputted.

The photographic print producing system of this invention is a system which makes photographic prints on the basis of image data information and service-related information (print service dealing information), and comprises a printer for producing photographic prints, a first input means for inputting first image data information and first service-related information to said printer, and a second input means for inputting second image data information and second service-related information which is different from said first service-related information to said printer.

According to the photographic print producing system of this invention, because it comprises a correlating device for correlating the inputted image data and the print-producing information for producing photographic prints on the basis of said inputted image data to be corresponding to each other, and a photographic print producing apparatus for producing a photographic print on the basis of said image data and said print-producing information for producing a photographic print on the basis of said image data, both of which are made to be corresponding to each other by said correlating device, and further comprises at least one correlating device to which print-producing information for producing a photographic print of a different kind of an order from the above-mentioned correlating device is inputted, in the case where a plurality of kinds of print-producing information are provided, if one correlating device is let to make the image data and one kind of print-producing information to be corresponding to each other, in order that an image may be printed, for example, as it is without processing the image data, and the other correlating device is let to make the image data and another kind of print-producing information to be corresponding to each other, in order that an image may be printed on the basis of the processed image data, then it is possible to print images rapidly and simply by using the one correlating device and it is also possible to print images of various kinds of modes by using the other correlating device.

According to the photographic print producing system of this invention, because it comprises a printer for producing a photographic print, a first input means for inputting first image data information and first service-related information to said printer, and a second input means for inputting second image data information and second service-related information which is different from said first service-related information to said printer, it is possible that said printer is let to print an image, for example, as it is without processing the image data in response to the input from the first input means, and said printer is let to print an image on the basis of the processed image data in response to the input from the second input means; owing to this, it is possible to use suitably either the first or the second input means on demand for producing prints rapidly and simply or for producing prints of various kinds of modes.

BRIEF EXPLANATION OF THE DRAWINGS

FIG. 2 is a block diagram of a photographic print producing system of the second embodiment;

FIG. 3 is a block diagram of a photographic print producing system of the third embodiment;

FIG. 4 is a block diagram of a photographic print producing system of the fourth embodiment;

FIGS. 20(a) and 20(b) are drawings showing a screen on the monitor display provided in this image processing system, and is a drawing showing the screen for selecting 'TWAIN';

FIG. 44 is a drawing showing a screen on the monitor display provided in this image processing system, and is a drawing showing the dialogue screen for re-inputting an image;

FIG. 45 is a drawing showing a screen on the monitor display provided in this image processing system, and is a drawing showing the dialogue screen for re-processing an image;

FIG. 46 is a drawing showing a screen on the monitor display provided in this image processing system, and is a drawing showing the dialogue screen for re-printing; and FIG. 47 is a drawing showing a screen on the monitor display provided in this image processing system, and is a drawing showing the dialogue screen for re-printing.

DETAILED DESCRIPTION OF THE PREFERRED EMBODIMENT

Figure 1:
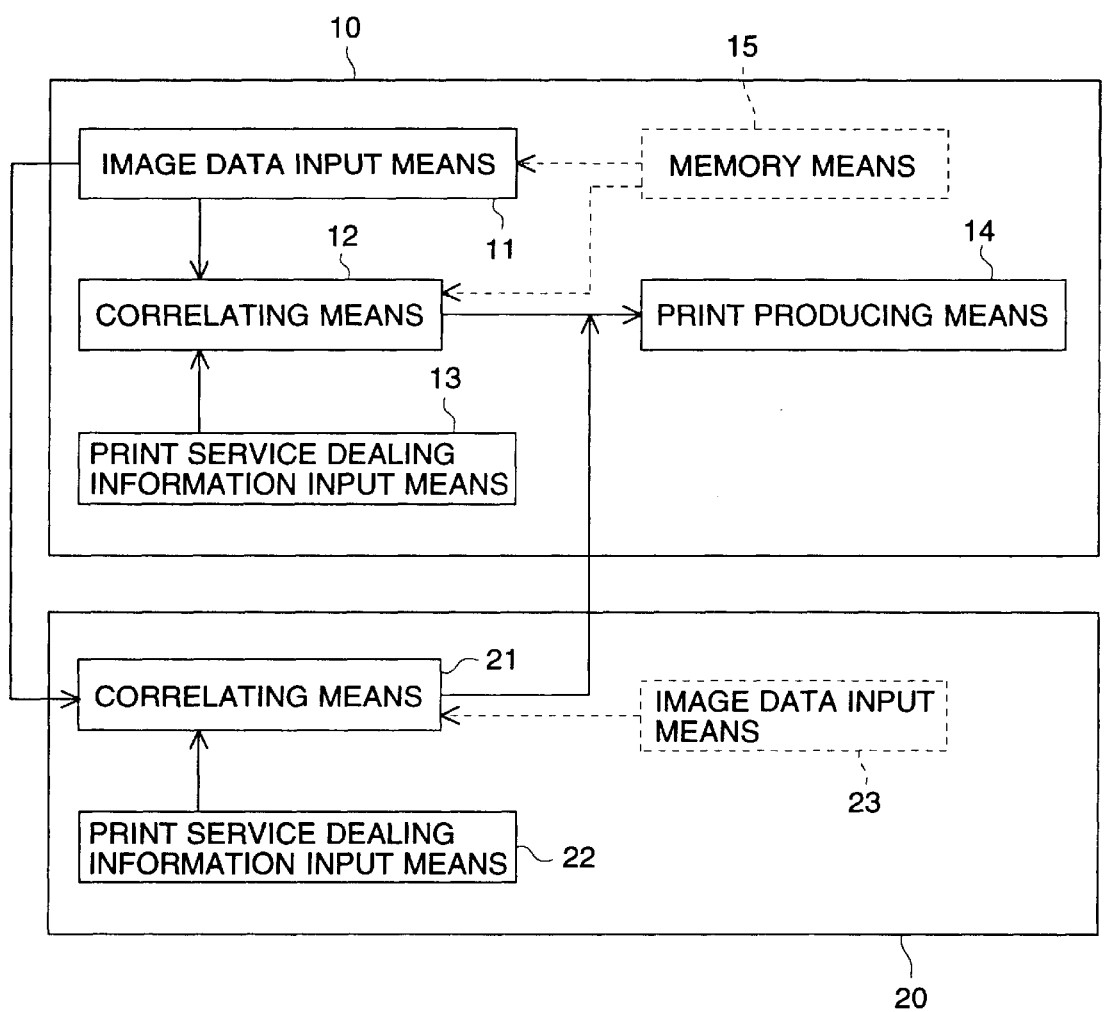
FIG. 1 is a block diagram of a photographic print producing system of the first embodiment of this invention.

In the following, this invention will be explained with reference to embodiments. FIG. 1 is a block diagram of a photographic print producing system of an embodiment of this invention. In FIG. 1, the photographic print producing system is composed of the image processing apparatus main body 10 and the auxiliary processing apparatus 20. The image processing apparatus main body is composed of the image data inputting means 11, the print service dealing information input means 13, the correlating means 12, and the print producing means 14. In addition, the image processing apparatus main body 10 may be equipped with the memory means 15.

The image processing apparatus main body 10 can make, for example, an ordinary photographic print (or a regular print which is a first print by the simultaneous printing or the following print by the reprinting by a photofinisher) on the basis of image data read. The image data inputting means 11 is made up of at least one of the following: a film scanner capable of reading an image on a developed negative-film, a flat-bed scanner capable of reading an image such as a photograph, a media driver capable of reading image data from recording media such as an FD, a CD-ROM, and an MO and a receiving device capable of receiving image data through communication. In this embodiment, it is assumed that image data are obtained by a film scanner.

On the other hand, the print service dealing information input means 13 is capable of inputting the service-related information (print service dealing information) which is composed of the number of prints, the print size, the information for specifying the image to be printed (a frame number, for example) which is added as occasion demands, and the information for correcting the color of the print to be finished. The correlating means 12 has a function to make the image data from the image data inputting means corresponding to the service-related information which is inputted from the print service dealing information input means 13 to prepare the print-producing information, and to transmit it to the print producing means 14. The print producing means 14 is capable of forming an image to be subjected to ordinary printing on a paper for forming an image (not shown in the drawing) on the basis of the print-producing information.

On the other hand, the auxiliary processing apparatus 20 can prepare the print-producing information for producing a value-added photographic print on the basis of, for example, image data read. The value-added photographic print is a coordinate concept against the ordinary photographic print, and, for example, it is possible to make a calendar, a postcard, a name card, a certification photograph, a composite photograph based on the image data, and so forth. Besides, in this embodiment, it is assumed that the auxiliary processing apparatus 20 has a function to prepare the print-producing information for producing a calendar.

The auxiliary processing apparatus 20 is composed of the print service dealing information input means 22 and the correlating means 21. Further, it is appropriate that the auxiliary processing apparatus is equipped with the auxiliary data inputting means 23. The print service dealing information input means 22 is capable of inputting the service-related information which is composed of at least the template image to be combined, and the following bits of information which are added as occasion demands, namely, the number of prints, the print size, the information for specifying the image to be printed (the frame number, for example), and the information for correcting the color of the prints to be finished. The correlating means 21 has a function to make the image data from the image data inputting means 11 or 23 corresponding to the service-related information inputted from the print service dealing information input means 22 to prepare the print-producing information, and to transmit it to the print producing means 14. Incidentally, in the case that the auxiliary processing apparatus 20 is not provided with image data input means 23, if an operator inputs the output destination of image data inputted from the inputting means 11, the correlating means 12 or the correlating means 21 can be selected as the output destination of image data. At this time, in the case that the regular printing is conducted, the operator inputs so as to designate the correlating means 12 as the output destination of image data, then, image data inputted from the image data inputting means 11 are outputted to the correlating means 12. On the other hand, in the case that the value-adding printing is conducted, the operator inputs so as to designate the correlating means 21 as the output destination of image data, then, image data inputted from the image data inputting means 11 are outputted to the correlating means 12.

Moreover, the image data inputting means 23 may be made up of at least one of the following: a film scanner capable of reading an image on a developed negative-film, a flat-bed scanner capable of reading an image such as a photograph, and a media driver capable of reading image data from recording media such as an FD, a CD-ROM, and an MO, and a receiving device capable of receiving image data through communication.

In the following, the operation of a photographic print producing system of this embodiment will be explained. For an example of use of such a print producing system, it is thought that it is set up in a laboratory or the like, for example, to form an image on the basis of an image of an exposed negative-film which is brought by a customer to the laboratory, or of an already developed negative-film. If the negative-film is not yet developed, it is developed by a predetermined process, and then each of the images of its respective frames is read to be converted into image data by the image data inputting apparatus 11.

Incidentally, in the conventional what is called simultaneous printing (the printing requested to be done in the same order as the developing), some simple requests such as, for example, the print size and the number of prints are received by the laboratory from a customer who has brought an exposed negative-film, and for the other image forming conditions, they are determined by the judge of the laboratory to carry out printing. Accordingly, it is possible to process a large amount of negative-films rapidly and at a comparatively low cost.

In contrast to this, there are also customers who wish to make a print such as a calendar, a name card, or a certification photograph by processing a specified image for example. In order to answer to the request of such customers it is necessary to select a set of conditions that fits most the imaging of the customer out of a large number of alternatives for determining the final set of image forming conditions. However, it is often difficult to make mass processing because it is very much time-taking to determine such kind of conditions. Further, actually there is a situation that there are not so many the cases where such a special processing is requested in comparison with the cases of simultaneous printing.

For these points of problem, according to this embodiment, the above-mentioned requests by customers which are opposing to one another can be made compatible in the following way. To state it concretely, in the image processing apparatus main body 10, so called ordinary photographic prints are made in order that rapid image forming may be performed on the basis of minimum amount of print-producing information. That is, the print service dealing information input means 13 has only a function to input the extremely limited service-related information composed of at least the number of prints and the print size; therefore, it can be carried out rapidly for the information to be made corresponding to the image data by the correlating means 12, and owing to it, it is possible to make prints rapidly.

On the other hand, by using the print service dealing information input means in the auxiliary processing apparatus 20, processing of image data is possible. To state it concretely, in the case where request by a customer is given, the conditions for image forming are determined by it that the operator inputs the optimum ones (those for a calendar in this embodiment) out of the wide-ranging items of selection such as the kind of print, the background of the image, the inputting of letters. In such a case, the print service dealing information input means 22 inputs the service-related information which includes at least a template image to be combined, and the correlating means 21 combines the image data with the template image to prepare image data concerning the calendar and transmits the data made as the print-producing information to the print-producing means 14.

As has been described in the foregoing, according to this embodiment, in the case, for example, where a customer requests so called ordinary photographic prints, the correlating means 12 of the image processing apparatus main body 10 makes the image data obtained from the image data inputting means 11 corresponding to the service-related information and transmits the print-producing information to the print producing means 14; by doing this, printing (direct print service) can be carried out simply and rapidly.

On the other hand, in the case where a customer requests an image-processed photographic print such as a calendar, the correlating means 21 of the auxiliary processing apparatus 20 makes the image data obtained from the image data inputting means 11 (or 23) corresponding to the service-related information obtained from the print service dealing information input means 22, and transmits the print-producing information to the print producing means 14; by doing this, printing which is fitted to the request of the customer (processed print service) can be carried out.

Further, the print service dealing information input means 22 is capable of inputting, in the case where a post card is made, the service-related information which is composed of at least the template image to be combined, and the following bits of information to be added as occasion demands, namely, the number of prints, the print size, the information for specifying the image to be printed (the frame number, for example), and the information for correcting the color of the prints to be finished.

Furthermore, the print service dealing information input means 22 is capable of inputting, in the case where a name card is made, the service-related information which is composed of at least the letters (the address and the name etc.) to be combined, and the following bits of information to be added as occasion demands, namely, the number of prints, the print size, the information for specifying the image to be printed (the frame number, for example), and the information for correcting the color of the prints to be finished.

Moreover, the print service dealing information input means 22 is capable of inputting, in the case where a certification photograph is made, the service-related information which is composed of at least the template image to be combined, and the following bits of information to be added as occasion demands, namely, the number of prints, the print size, the information for specifying the image to be printed (the frame number, for example), and the information for correcting the color of the prints to be finished.

Besides, the print service dealing information input means 22 is capable of inputting, in the case where a composite photograph composed of two images for example is made, the service-related information which is composed of at least the information concerning which image is to be combined to which image, and the following bits of information to be added as occasion demands, namely, the number of prints, the print size, the information for specifying the image to be printed (the frame number, for example), and the information for correcting the color of the prints to be finished.

FIG. 2 is a block diagram showing a photographic print producing system of the second embodiment. In FIG. 2, the print producing system is composed of the first image processing apparatus 110, the second image processing apparatus 120, the third image processing apparatus 130, and the print producing means 114 connected by the network N. The image processing apparatus 110, 120, and 130 are composed of the respective image data inputting means 111, 121, and 131, the respective print service dealing information input means 113, 123, and 133, and the respective correlating means 112, 122, and 132.

In the print producing system of this embodiment, the first image processing apparatus 110 is capable of transmitting the print-producing information for producing ordinary photographic prints to the print producing means 114 through the network N, and the second image processing apparatus 120 is also capable of transmitting the print-producing information for producing ordinary photographic prints to the print producing means 114 through the network N; further, the third image processing apparatus 130 is capable of transmitting the print-producing information for producing a value-added print (such as a name card) to the print producing means 114 through the network N. Further, for the function of each means, the detailed explanation of it is omitted because it is similar to the above-described embodiment.

FIG. 3 is a block diagram showing a photographic print producing system of the third embodiment. In FIG. 3, the print producing system is composed of the first image processing apparatus 210, the second image processing apparatus 220, the third image processing apparatus 230, and the print producing means 114 connected by the network N. The image processing apparatus 210, 220, and 230 are composed of the respective image data inputting means 211, 221, and 231, the respective print service dealing information input means 213, 223, and 133, and the respective correlating means 212, 222, and 232.

In the print producing system of this embodiment, the first image processing apparatus 210 is capable of transmitting the print-producing information for producing ordinary photographic prints and a post card to the print producing means 114 through the network N, and the second image processing apparatus 220 is also capable of transmitting the print-producing information for producing ordinary photographic prints and a post card to the print producing means 114 through the network N; further, the third image processing apparatus 230 is capable of transmitting the print-producing information for producing ordinary photographic prints and a composite photograph to the print producing means 114 through the network N. Further, for the function of each means, the detailed explanation of it is omitted because it is similar to the above-described embodiment.

FIG. 4 is a block diagram showing a photographic print producing system of the fourth embodiment. In FIG. 4, the print producing system is composed of the first image processing apparatus 310, the second image processing apparatus 320, the third image processing apparatus 330, and the print producing means 114 connected by the network N. The image processing apparatus 310, 320, and 330 are composed of the respective image data inputting means 311, 321, and 331, the respective print service dealing information input means 313, 323, and 333, and the respective correlating means 312, 322, and 332.

In the print producing system of this embodiment, the first image processing apparatus 310 is capable of transmitting the print-producing information for producing ordinary photographic prints to the print producing means 114 through the network N, and the second image processing apparatus 320 is also capable of transmitting the print-producing information for producing ordinary photographic prints to the print producing means 114 through the network N; further, the third image processing apparatus 230 is capable of transmitting the print-producing information for producing ordinary photographic prints and a calendar to the print producing means 114 through the network N. Further, for the function of each means, the detailed explanation of it is omitted because it is similar to the above-described embodiment.

Figure 5A:
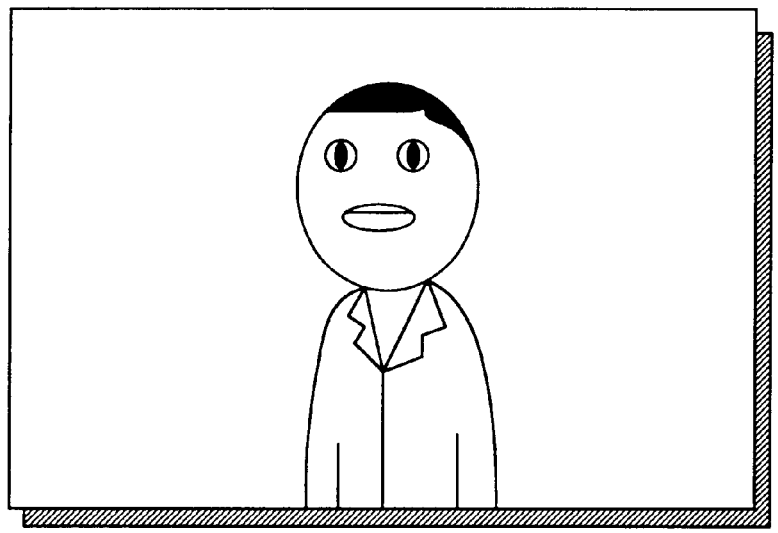
FIGS. 5(a) and 5(b) are drawings showing examples of photographic prints made by a photographic print producing system of this invention.
Figure 5B:
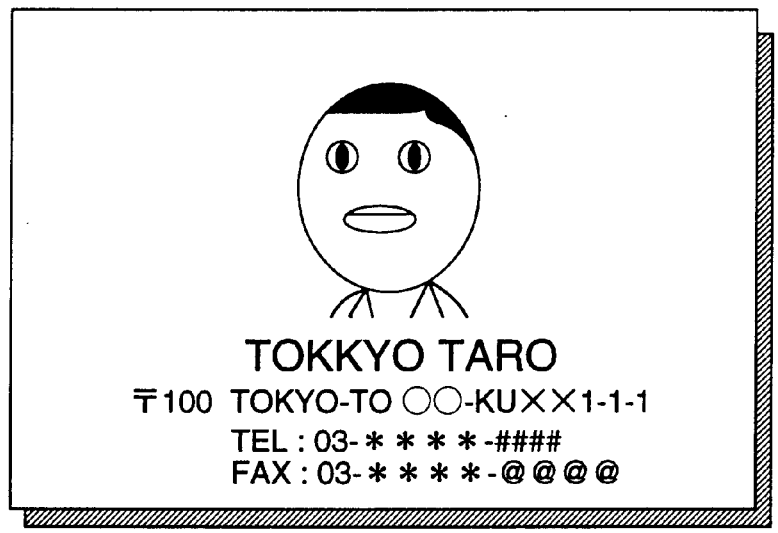

In FIG. 5, an example of image forming by the ordinary printing (a) and an example of image forming in the form of a name card as an example of image processing (b), both of which are obtained by the photographic print producing system of the above-described embodiment.

Up to now, this invention has been explained with reference to the embodiments, however, this invention should not be interpreted as one limited to the above-described embodiments, and it is a matter of course that that the invention can be suitably altered and improved.

Incidentally, in such a photographic print producing system, in the case where image forming is done from a large quantity of negative-films, there is a thought to reduce the amount of information to be inputted by an operator to the utmost to make the efficiency of printing as high as possible in order to reduce the processing time. With regard to this, for the information required for producing prints (for example, the number of prints), there is also a thought that producing the efficiency of printing higher is accelerated by memorizing the value which is estimated to be most frequently used as a initial value beforehand and carrying out the printing automatically up to the number of prints of the initial value if the operator does not input the number of prints.

However, it is thought of also a case where, for example, an unskilled operator to the system fails to input the number of prints when it is to be inputted properly. In such a case, because the number of prints is determined to the initial value compulsorily, there is a possibility that printing is carried out to the number which is not desired by the operator, and doing over again of the operation occurs owing to this, which makes the efficiency of the printing reduced all the worse. There is a possibility that the similar problem may be produced concerning the decide of the place for storing image data and the decide of the format of a graphics file for storing image data.

Therefore, in view of the above-mentioned points of problem, it is desirable to provide a photographic print producing system capable of preventing undesired operations to the utmost, having even the ability of improving the efficiency of operation.

In the following, the desirable photographic print producing system will be explained. The photographic print producing system of this invention is such one as described in the following paragraphs (1) to (4):

(1) A photographic print producing system comprising input means for inputting the number of prints to be made from image data of one image frame and print producing means for instructing the producing of photographic prints to the number of prints inputted by said input means on the basis of said image data, wherein a number for the number of prints to be made from image data of one image frame is set beforehand, and when a number for the number of prints is inputted by said input means, said number inputted is set as the number of prints to be executed with priority to said number set beforehand, and in the case where instruction to make prints by said print producing means is given without inputting a number for the number of prints by said input means, confirmation for it that the producing of prints for said number set beforehand will be carried out is indicated.

Accordingly, even in the case where, for example, an operator has not inputted a number for the number of prints by said input means through an error, an expression is made after that in confirmation of it that the producing of prints to the number of prints set beforehand will be carried out; hence, owing to such expression of confirmation, the operator is convinced that he has not inputted a number for the number of prints, and owing to this, printing that the operator has not intended to do can be prevented.

(2) A photographic print producing system for producing photographic prints on the basis of image data comprising means for displaying a place for memorizing image data which displays a plurality of places for memorizing image data capable of memorizing image data, means for selecting and setting a place for memorizing image data which selects and sets a place for memorizing image data to memorize said image data out of said plurality of places for memorizing image data, and means for instructing memorization of image data which instructs memorization of said image data in the place for memorizing image data selected and set by said means for selecting and setting a place for memorizing image data, wherein a place for memorizing image data to memorize said image data is set beforehand, and in the case where a place for memorizing image data is selected and set by said means for selecting and setting a place for memorizing image data, said place for memorizing image data selected and set is set as a place for memorizing image data to be executed with priority to said place for memorizing image data having been selected and set beforehand, and in the case where instruction for memorizing image data is given by said means for instructing memorization of image data without selecting and setting a place for memorizing image data by said means for selecting and setting a place for memorizing image data, confirmation of it that said image data will be memorized in said place for memorizing image data having been set beforehand is indicated.

Accordingly, even in the case where, for example, an operator has not selected and set a place for memorizing image data by said means for selecting and setting a place for memorizing image data through an error, after that, an expression is made in confirmation of it that said image data will be memorized in the place for memorizing image data having been set beforehand; hence, by such expression of confirmation, the operator is convinced that he has not selected and set a place for memorizing image data, and owing to this, memorizing image data in a place that the operator has not intended to select can be prevented.

(3) A photographic print producing system for producing photographic prints on the basis of image data comprising means for displaying a format of a graphics file which displays a plurality of formats of image file capable of memorizing image data, means for selecting and setting a format of a graphics file which selects and sets a format of a graphics file to memorize said image data out of said plurality of formats of a graphics file, and means for instructing memorization of image data which instructs memorization of said image data in the format of a graphics file selected and set by said means for selecting and setting a format of a graphics file, wherein said format of a graphics file to memorize said image data is set beforehand, and in the case where a format of a graphics file is selected and set by said means for selecting and setting a format of a graphics file, said format of a graphics file selected and set is set as a format of an image to be executed with priority to said format of a graphics file having been selected and set beforehand, and in the case where instruction for memorizing image data is given by said means for instructing memorization of image data without selecting and setting a format of a graphics file by said means for selecting and setting a format of a graphics file, confirmation of it that said image data will be memorized in said format of a graphics file having been set beforehand is indicated.

Accordingly, even in the case where, for example, an operator has not selected and set a format of a graphics file by said means for selecting and setting a format of a graphics file through an error, after that, an expression is made in confirmation of it that said image data will be memorized in the format of a graphics file having been set beforehand; hence, by such expression of confirmation, the operator is convinced that he has not selected and set a format of a graphics file, and owing to this, memorizing image data in a place that the operator has not intended to select can be prevented.

(4) A photographic print producing system for producing photographic prints on the basis of image data comprising memorizing means for memorizing a basic condition, input means for inputting a desired condition, setting means for setting said desired condition as processing information which is necessary for processing image data in the case where said desired condition have been inputted by said input means and for setting said basic condition as said processing information in the case where said desired condition has not been inputted by said input means, and notifying means for notifying that said setting means sets said basic condition as said processing information in the case where said desired condition has not been inputted by said input means.

Accordingly, even in the case where, for example, an operator has not inputted a desired condition by said input means through an error, after that, an expression is made in confirmation of it that said basic condition will be set as said processing information; hence, by such expression of confirmation, the operator is convinced that he has not inputted a desired condition, and owing to this, processing that the operator has not intended to do can be prevented.

Figure 6:
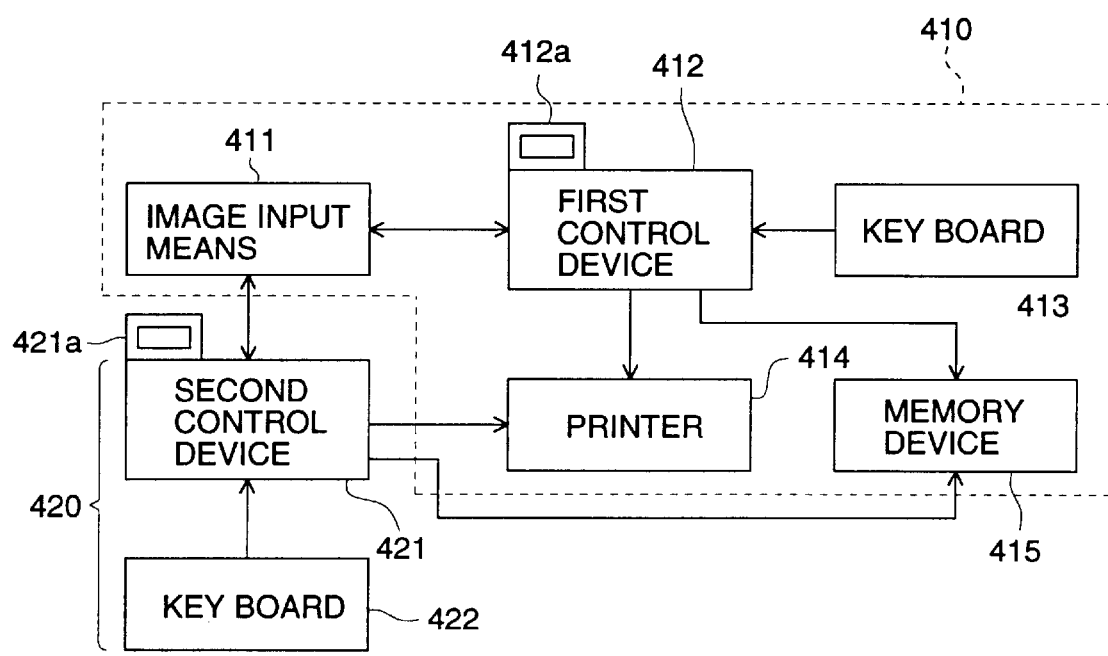
FIG. 6 is a block diagram of a photographic print producing system of an embodiment of this invention.
Figure 7:
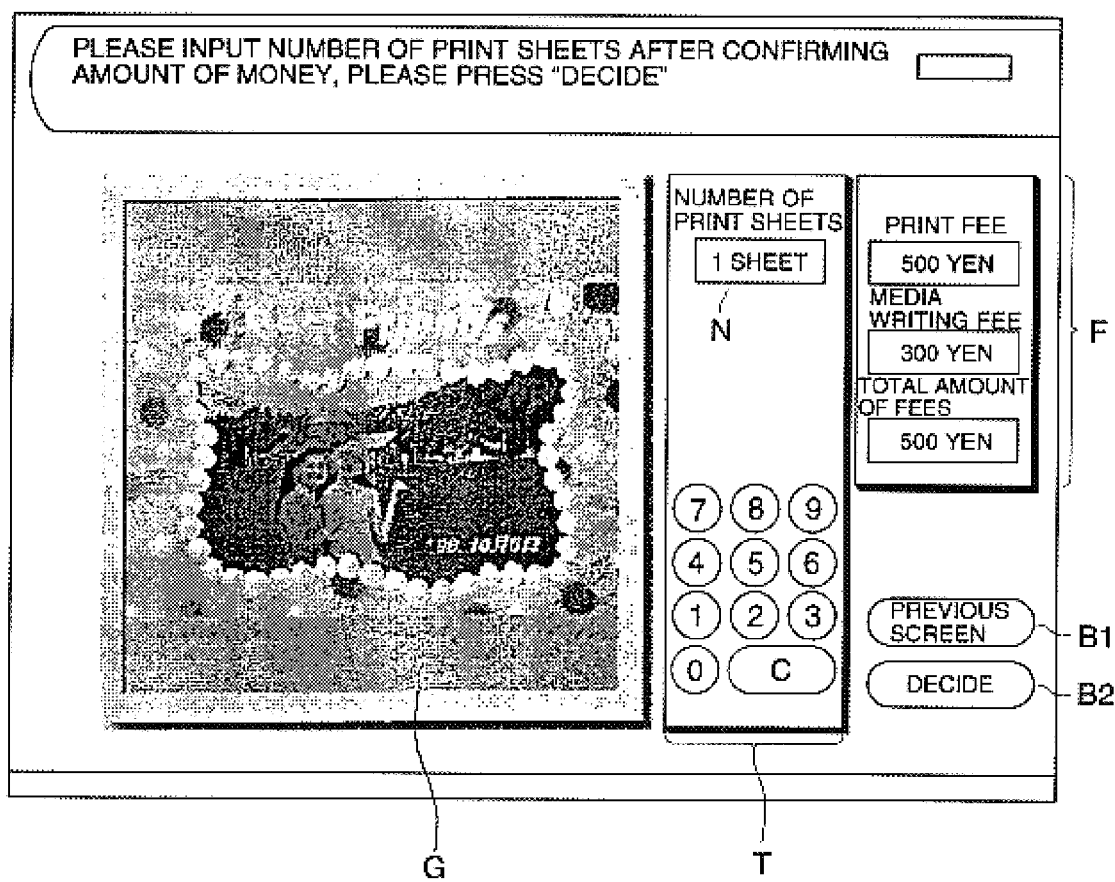
FIG. 7 is a drawing showing an example of an image displayed on the monitor 21a of the second control apparatus 21.

In the following, the above embodiments described in the paragraphs (1) to (4) will be explained. FIG. 6 is a block diagram of a photographic print producing system of an embodiment of this invention. In FIG. 6, the print producing system is composed of the image processing apparatus main body 410 and the auxiliary processing apparatus 420. The image processing apparatus main body 410 is composed of the image inputting device 411 comprising an image sensor made up of a large number of pixels (not shown in the drawing), the first control apparatus equipped with the keyboard 413 having means for inputting service-related information, the printer 414, and the memory device 415 for memorizing image data.

The first control apparatus 412 equipped with the monitor 4412a is capable of controlling the image inputting device 411 and the printer 414 on the basis of the input from the keyboard 413 by an operator. The image inputting device 411 is made up of at least one of the following: a film scanner capable of reading an image on a developed negative-film, a flat-bed scanner capable of reading an image such as a photograph, and a medium driver capable of reading image data from a recording medium such as an FD, a CD-ROM, or an MO. Accordingly, in this embodiment, the image inputting device 411 is let to convert an image, for example, of a negative-film into image data by the image sensor, and transmit the data to the printer 414 through the first control apparatus 412, under the control of the first control apparatus 412; however, it is capable of reading image data from a recording medium and transmitting the data. On the other hand, the printer 414 is capable of forming an image on an image forming paper (not shown in the drawing) on the basis of the image data received under the control of the first control apparatus 412. Further, for the printer 414, in addition to the silver halide printing method, ink-jet printing method, electrophotographic method, and others can be employed as the method of printing. Furthermore, the image data obtained from the image inputting device 411 is transmitted to the memory device 415 through the first control apparatus 412, and are stored there. Besides, the memory device 415 is capable of writing image data in the folder of a plurality of kinds of memory media (a hard disk drive, FD, CD-R, DVD, etc.).

On the other hand, the auxiliary processing apparatus 420 comprises the second control apparatus equipped with the monitor 421a and the keyboard 422 having means for inputting service-related information. The second control apparatus is also capable of controlling the image inputting device 411 and the printer 414 on the basis of the input from the keyboard 422 by an operator. Under the control of the second control apparatus 421, the image inputting device 411 is capable of transmitting the obtained image data to the printer 414 through the second control apparatus 421. Further, the image data obtained from the image inputting device 411 is transmitted to the memory device 415 through the second control apparatus 421, and are stored there. Furthermore, the first control apparatus 412 and the second control apparatus 421 make up the inputting means, the means for selecting and setting a place for memorizing image data, the means for instructing memorization of image data, and the means for selecting and setting a format of a graphics file. Besides, the monitor 412a and the monitor 421a make up the display means and the notifying means.

In the following, the operation of a photographic print producing system of this embodiment will be explained. For an example of use of such a print producing system, it is thought that it is set up in a laboratory or the like, for example, to form an image on the basis of an image of an exposed negative-film which is brought by a customer to the laboratory, or of an already developed negative-film. If the negative-film is not yet developed, it is developed by a predetermined process, and then each of the images of its respective frames is read to be converted into image data by the image data inputting apparatus 411.

In this embodiment, utilizing the monitor which is capable of changing over hierarchy-wise, it is possible to input the printing conditions in a dialogue form, and printing answering to the request of customers can be carried out by it. The operations to be shown in the following are those that can be carried out in the second control apparatus 421, but they can be carried out also in the first control apparatus 412 in the same way. FIGS. 7 to 10 are the drawings showing the screens displayed on the monitor 421a of the second control apparatus 421. On the screen shown in FIG. 7 capable of inputting the number of prints, the image G of which processing has been finished in the previous stage of work is displayed at the center. At the upper right portion of the image G, the number of prints N is displayed, and at the lower right portion, the numerical keys T are displayed. Further, to the right side of the display of the number of prints N, the print charges F are displayed, and to the right side of the numerical keys T, the button B1 for returning to the previous screen and the button B2 for determining the conditions are disposed.

The monitor 421a is equipped with an input device of a touch panel type, and if an operator presses some of the numerical keys T on the monitor screen with a finger, then the numerical value of the pressed key is inputted in the second control apparatus 421. For example, in the case where the number of prints should be made 5 answering to the request of a customer, the operator presses the key '5' of the numerical keys T, by which the display of the number of prints N is changed over to '5'. After that, the number of prints is determined to '5' when the operator presses the button B2, and the printing of five sheets is carried out through passing the predetermined stages of work. Further, in this specification, 'the number of prints' means the number of prints prepared from image data of one image frame.

Incidentally, in the print producing system of this embodiment, in order to reduce the labor for inputting, for the information which is most frequently used, it is stored in the built-in memory of the second control apparatus 421 beforehand. For example, concerning the number of prints, if the number of prints which is most frequently used is '1', the number of prints '1' is stored in this built-in memory as the basic condition. Further, when the screen has changed over to the one shown in FIG. 7, an operator can recognize that the basic condition is '1' at this timing by it that '1' is indicated at first in the display of the number of prints N.

As described in the above, it may be considered that as long as an operator watches the screen of the monitor, it does not so often occur that he makes a mistake in inputting the conditions. However, in the case where an operator is not experienced to the system, sometimes he does not watch the screen, and it is possible that he presses the button B2 through an error without pressing some of the numerical keys T, although he should properly make the number of prints five in accordance with the request of the customer. In such a case, because the number of prints is determined as '1' compulsorily in accordance with the basic condition, if printing is carried out without any confirmation, only one print is made and the request of the customer can not be met. As the result of this, the operator must repeat the operation in the same procedure, which is considered as preventing it to make the operation efficient.

Figure 8:
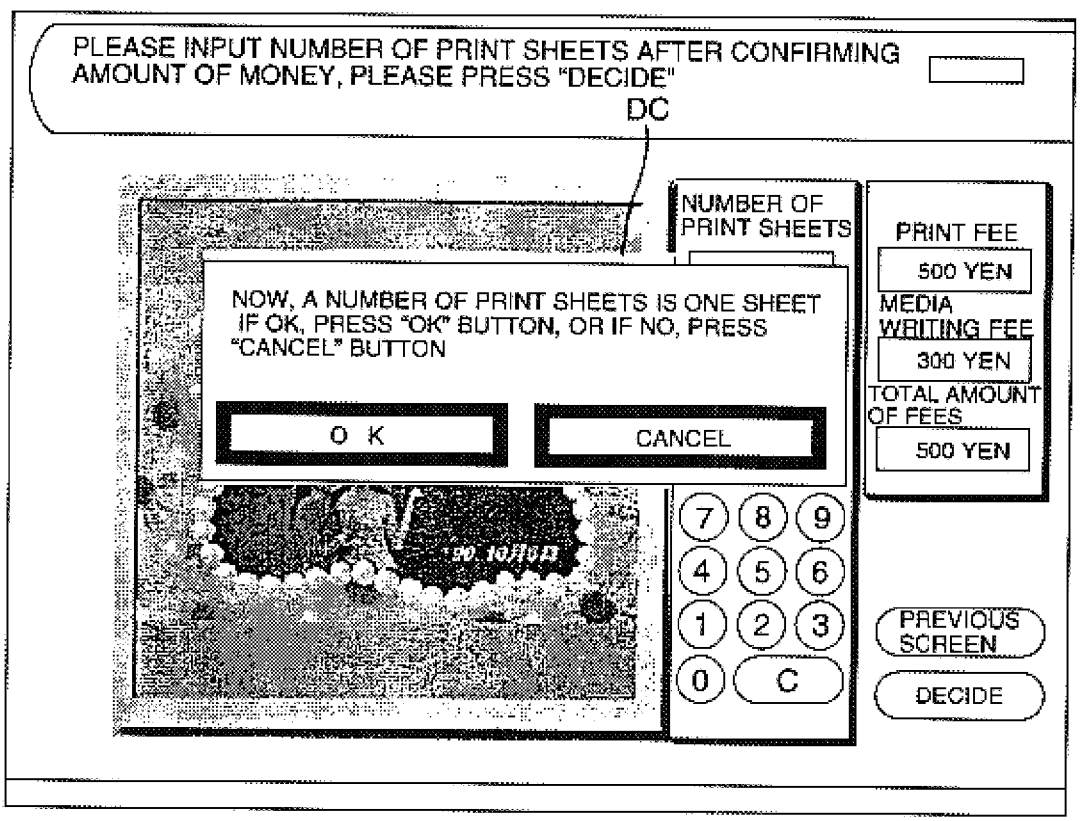
FIG. 8 is a drawing showing an example of an image displayed on the monitor 21a of the second control apparatus 21.

Therefore, in this embodiment, in the case where an operator presses the button B2 without pressing some of the numerical keys T, as shown in FIG. 8, the request for confirmation DC is displayed as an overlay at the center of the screen. Accordingly, the operator who has seen this request for confirmation DC is let to know that the number of prints set at present is one, and if this is the print number he intends to make, he can proceed to the next stage of work by pressing the OK button. On the other hand, if the number of prints set is different from that he intends to make, by pressing the cancel button, the screen changes over to that shown in FIG. 7 again, and on that screen, the operator can input a necessary number for the number of prints as a desired condition using the numerical keys T. Further, in the case where an operator presses the button B2 after he has pressed some of the numerical keys T (it may be '1'), it is obvious that a print number which the operator intends to set is inputted; hence, in order to make the operation efficient, no request for confirmation DC shown in FIG. 8 is made, but it may be allowed to make request for confirmation DC for the purpose of double confirmation.

Figure 9:
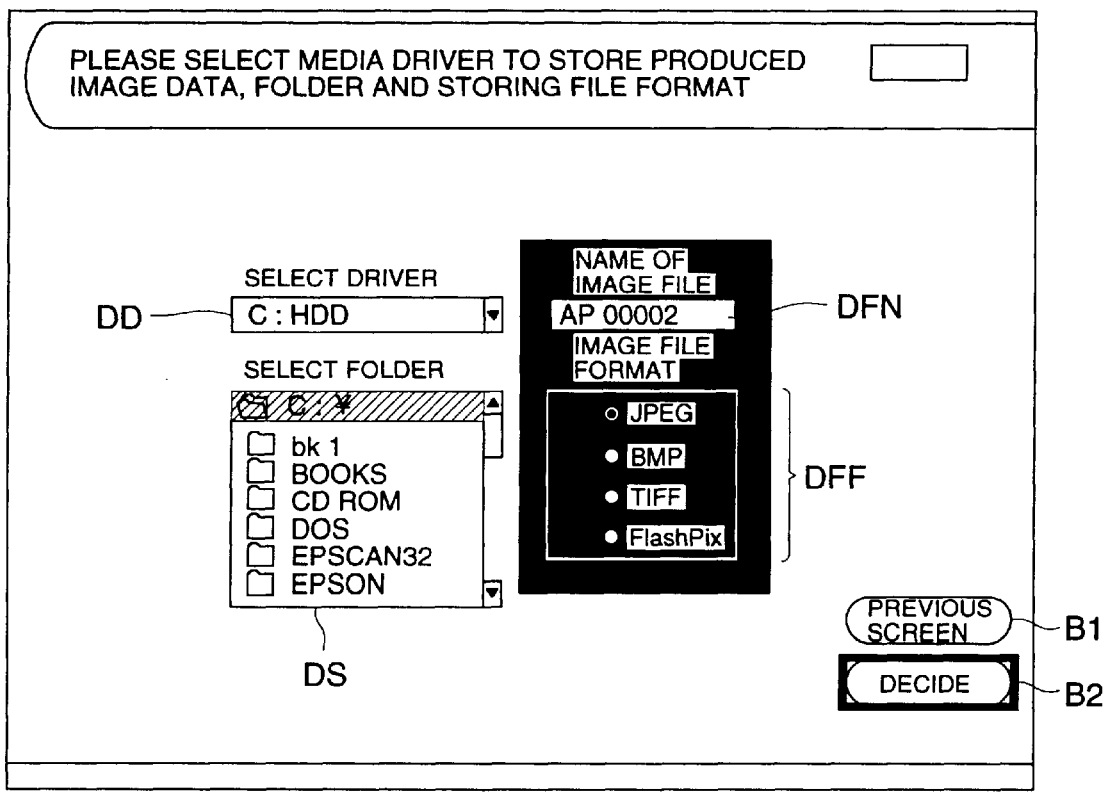
FIG. 9 is a drawing showing an example of an image displayed on the monitor 21a of the second control apparatus 21.

Further, in the print producing system of this embodiment, it is possible to record image data based on an image of a negative-film in a predetermined format of a graphics file on a recording medium or the like. FIG. 9 shows a screen capable of selecting and setting a place for memorizing image data of the memory device for memorizing image data 415 and a format of a graphics file in memorizing. In the screen shown in FIG. 9, in the upper left portion, the sign DD indicating the recording medium in which image data are to be recorded (in FIG. 9, a hard disk drive: HDD) is disposed, and under it, the names of folders DS included in the recording medium corresponding to the sign DD are displayed. Furthermore, to the right of the sign DD indicating the recording medium, the name of the image file DFN which includes the image data to be recorded is displayed, and under it, the names of formats of a graphics file DFF in which the image data are to be recorded are displayed.

On the screen shown in FIG. 9, an operator can select, for example by using a scroll bar, a place in which he wishes to memorize the image file DFN (AP00002 in FIG. 9) (the recording medium and the name of a folder), and also a format of a graphics file (for example, JPEG) in memorizing the file. After that, when the operator presses the button B2, the place for memorizing and the format of a graphics file are determined, and the recording of image data can be performed.

In the print producing system of this embodiment, in order to reduce the labor of inputting, the place for memorizing image data (for example, HDD) and the format of a graphics file (for example, JPEG) both of which are most frequently used are memorized beforehand as the basic conditions in the built-in memory of the second control apparatus 21. Accordingly, it can be considered that, for an operator who does not wish to change over these conditions, it is desirable to start memorizing image data immediately by pressing the button B2 directly.

However, it is possible that an operator presses the button B2 through an error, although he wishes to change over the place for memorizing image data or the format of a graphics file. In such a case, if memorizing image data is carried out without any confirmation, the processing is made to be one that is not intended by the operator, and re-doing of the operation becomes necessary.

Figure 10:
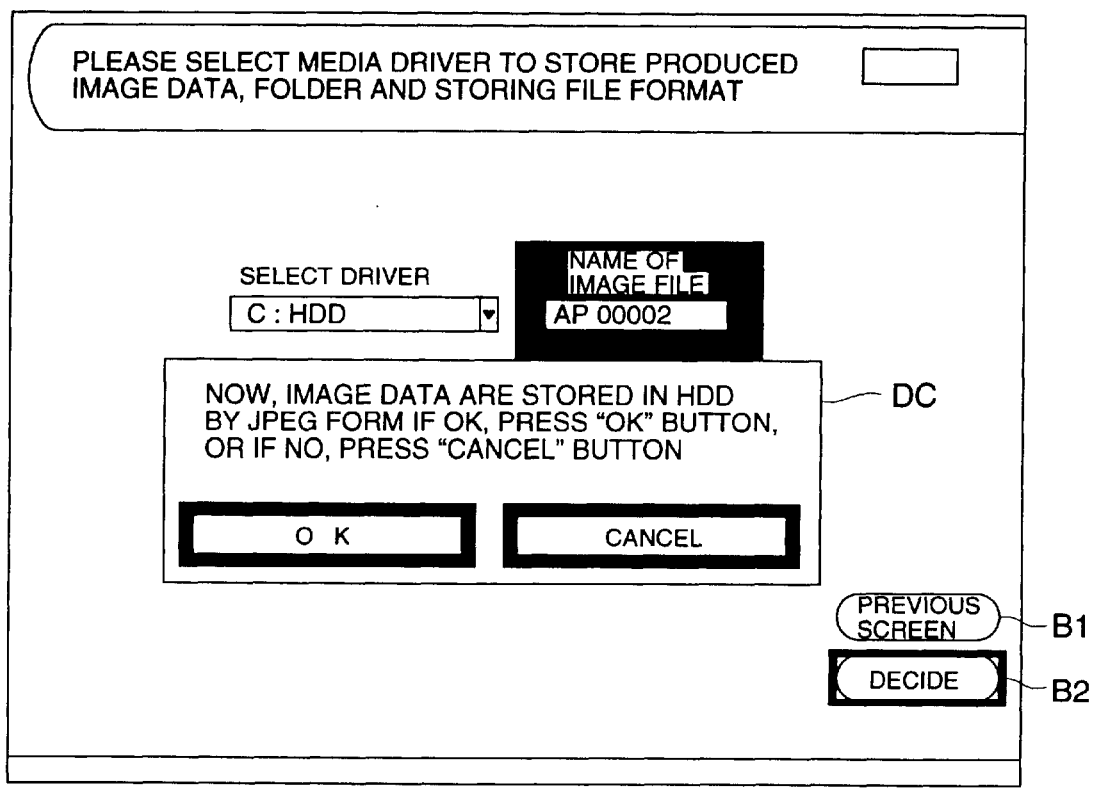
FIG. 10 is a drawing showing an example of an image displayed on the monitor 21a of the second control apparatus 21.

Therefore, in this embodiment, in the case where an operator presses the button B2 without changing over the place for memorizing image data or the format of a graphics file, as shown in FIG. 10, the request for confirmation DC is displayed as an overlay at the center of the screen. Accordingly, the operator who has seen such request for confirmation DC is let to know that the place for memorizing image data and the format of a graphics file remain as the basic conditions, and if they are the conditions that the operator intends, memorizing can immediately be started by pressing the button B2. On the other hand, if the basic conditions displayed are different from those which the operator intends, by pressing the cancel button, the screen changes over into that shown in FIG. 9 again, and on that screen, the operator can change over the place for memorizing image data or the format of a graphics file into that he intends and input it as a desired condition on the screen. Further, in the case where an operator presses the button B2 after he changes over the condition, it is obvious that a desired condition has been inputted; hence, in order to make the operation efficient, no request for confirmation DC shown in FIG. 10 is made, but it is allowed to make request for confirmation DC for the purpose of double confirmation.

As described in the above, according to this embodiment, in the case where processing such as producing prints or memorizing image data is done on the basis of the basic condition memorized beforehand, processing through an error can be prevented before it happens, because it is made the expression of confirmation to the effect that processing will be carried out on the basis of the basic condition.

Up to now, this invention has been explained with reference to the embodiments; however, this invention should not be interpreted as one limited to the above-described embodiments, and it is a matter of course that it can be altered and/or improved. For example, for the basic conditions, the information is not limited to the above-mentioned number of prints, but it may be the print size, the kind of processing (calendar, name card, certification photograph, etc.). Further, the input of the conditions etc. can be done through a mouse or a keyboard without using the monitor of a touch panel type. Furthermore, instead of displaying a request for confirmation, or on top of it, it may be appropriate to make a vocal expression such that 'the number of prints is one', or to sound a warning such as a buzzer.

Incidentally, for an image processing apparatus, there are some cases where information necessary for processing must be inputted in addition to image data. As a concrete example of such information, it is thought of selecting which kind of an image forming member an image is formed on, which kind of a recording medium image data are recorded in, or others in producing photographic prints on the basis of the image data read from a negative-film or in memorizing the data in a recording medium.

An operator can make this selecting in a dialogue form while watching the screen of the display provided in the image processing apparatus. However, even though the size of a sheet on which an image is formed is indicated by letters such as 'KG', '2L', and '⅙-cut' (8 inch×10 inch), if the operator is not familiar with them, it is possible that he can not grasp the size at once. On the other hand, concerning the sheet on which image is formed, various kinds of materials such as a paper and a transparency are thought of; however, it is possible too that an operator who is not familiar with it can not recognize the material, even though the number of type or the like is indicated on the screen of the display by letters. The similar problem may occur in selecting a recording medium in which image data are memorized.

In respect of the above-mentioned problems, it can be thought of, for example, that an explanation such that, for example, 'KG is a size of 102 mm length, 152 mm width' is indicated on the screen of the display as occasion demands. However, if an operator inputs information in the image processing apparatus by watching explanations for every items, it takes time for him to do the input operation, and it can not be promoted to make processing efficient. Therefore, some measure for an operator to grasp the information which he wishes to input becomes necessary.

Further, in the case where different kinds of information are inputted, the screen of the display can be switched over hierarchy-wise. To state it more concretely, if one of the alternatives of the first group is selected, the alternatives of the second group connected with the having been selected alternative, then the operator has only to select one of them, by which the input of information can be carried out rapidly and simply.

However, it can be thought of the case where, at the timing when an alternative of the second group which is connected with the selected alternative is indicated, the operator interrupts the operation of image processing by some other thing to do. In such a case, if the time until his returning to the operation is comparatively long, it is possible that the operator forgets what kind of processing he is going to do.

In such a case, it can be thought of that the input of information is done over again from the first step by letting the image processing apparatus return to the initial state; however, the information which has been inputted with effort become of no effect and it can not be promoted to make processing efficient. On the other hand, it is also thought of to input all the necessary information by only one screen, but in most cases, for a person who is not familiar with the image processing apparatus, such an operation is difficult.

Therefore, in view of the above-described problems, it is desirable that the input of information can be done easily and to make processing efficient can be promoted. In the following, the desirable structures (5) and (6) will be explained:

(5) An image processing apparatus comprising display means for displaying an image which is varied in accordance with the kind of an image forming member and selecting means for selecting at least one of the kinds of an image forming member displayed by said display means.

Accordingly, for example, in the case where the image forming member is a sheet-shaped image forming member, by displaying the images of the sheets which were reduced in proportion to the sizes of the sheets arranged side by side on said display means, the operator who watches this display means can recognize the size of the image forming member on which he is going to form an image at a glance, by which selection of image forming member can be carried out easily.

(6) An image processing apparatus for processing an image on the basis of inputting a plurality of kinds of information comprising display means having a screen which can be changed over by inputting information, wherein when said screen has been changed over, said display means indicates at least a part of information of which inputting has been already finished on said screen after change over.

Accordingly, the operator can easily judge what kind of information he inputted before the screen has been changed over, by which input of information can be carried out easily.

Figure 11:
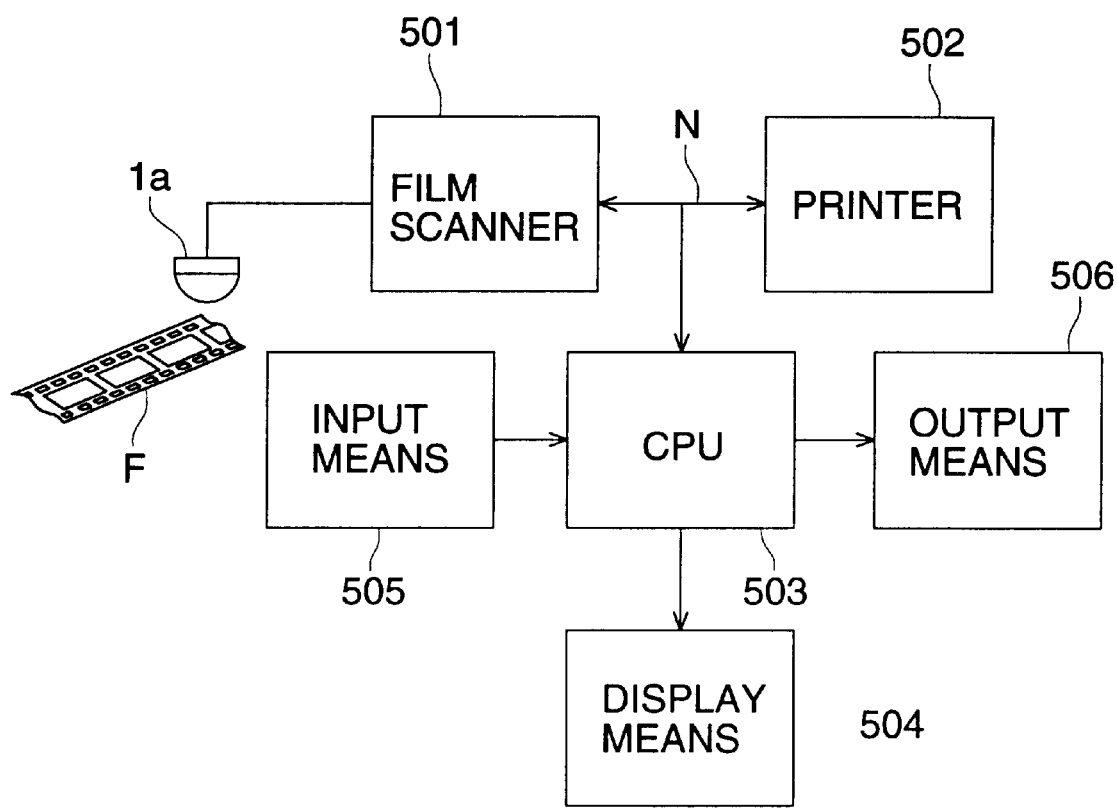
FIG. 11 is a block diagram of an image processing apparatus of an embodiment of this invention.

In the following, the above-described embodiments (5) and (6) will be explained. FIG. 11 is a block diagram of an image processing apparatus of the embodiment of this invention, expressing the image processing apparatus main body 510 or the auxiliary processing apparatus 520. In FIG. 11, the film scanner 501 comprising the image sensor 501a made up of a large number of pixels, the printer 502, and the CPU 503 are connected by the network N. The film scanner 501 as a reading means is capable of converting an image of a negative-film into image data by the image sensor 501a, and transmitting the data to the CPU 503 or to the printer 502 through the network N. The printer 502 has a function to form an image on the basis of the transmitted image data and the print information. Further, instead of a film scanner, image data can be inputted also from a flat bed scanner, which is not shown in the drawing, or the image data can be inputted from a recording medium such as a CD-R, an MO, or the like.

The CPU 503 can display an image by means of the display means 504 having a display (not shown in the drawing). Further, the information inputted through the input means 505 such as a keyboard having means for inputting service-related information is transmitted from the CPU 503 to the film scanner 501 through the network N. Furthermore, the CPU 503 (the correlating means) is capable of recording image data in a recording medium such as an FD, or a CD-R through the output means 6.

Figure 12:
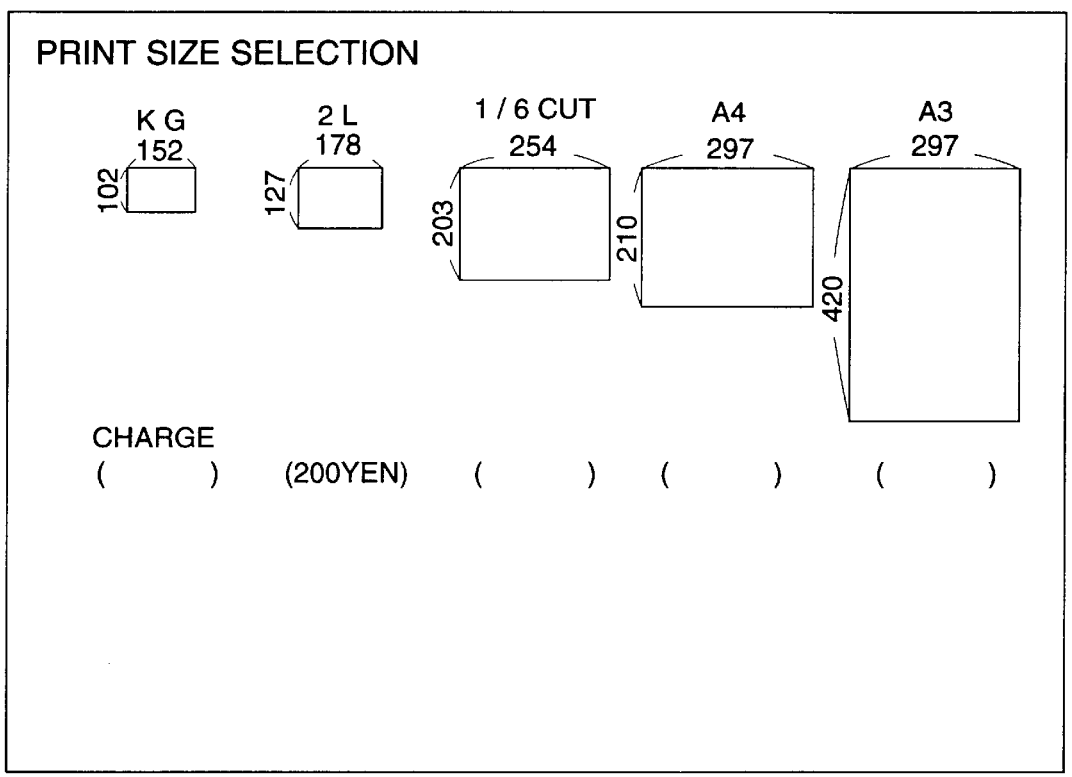
FIG. 12 is a drawing showing of an example of a displayed image on the display means 4.

FIG. 12 is a drawing showing an example of the displayed screen of the display means 504. The screen shown in FIG. 12 is one mode of display indicated on the display of the display means at the time of inputting the information which is necessary in forming an image through the input means 505 (FIG. 11). FIG. 12 is a screen capable of selecting the print size, by which an operator can select the desired size out of the indicated size names (KG, 2L, ⅙-cut, A4, A3).

In this case, in the case where the information indicated on the display screen is only the size names, it is possible that an operator who is not used to the image processing apparatus can not judge what size, for example, '⅙-cut' is. Therefore, in this embodiment, the similar figures of the prints reduced by a definite magnification in accordance with the print sizes are indicated under the letters denoting the kinds of the sizes. Accordingly, an operator who watches this display can understand at a glance that '⅙-cut' (8 inch×10 inch), for example, is a size which is a little smaller than 'A4'.

Further, in this embodiment, in addition to the rectangular shapes corresponding to the respective print sizes, the longitudinal sizes and the lateral sizes of them are displayed at the same time. Accordingly, an operator who watches this display understands immediately that, for example, '⅙-cut' is 203 mm in length and 254 mm in width as the concrete size. In this embodiment as described above, by only having a look at the screen on the display, an operator can select the desired print size at once; hence, it is possible to make the efficiency of inputting information higher, and also mistakes such as selecting a wrong print size can be prevented.

Furthermore, in this embodiment, in the case where a print size is selected with the number of prints, which is a bit of information inputted separately, taken into consideration, in addition to the selected size, it is indicated under it how much the charge for the print producing is. In addition, in FIG. 12, it is indicated a screen such that '2L' size is selected as the print size. Further, instead of a charge, or in addition to it, it is possible to indicate the time to be necessary for processing.

In the embodiment shown in FIG. 12, at the time of inputting a print size, the operation is made easy by using figures; however, the invention is not limited to this, and it is also possible that, for example, the name of the recording medium in which the image data are to be recorded (HDD, CD-R, FD, etc.) and the shape of the medium are indicated on the screen of the display.

Incidentally, the image processing apparatus of this embodiment is made in such A manner as to have the screen of the display changed over hierarchy-wise every time when information is inputted to state it more concretely, for example, when an operator selects a mode of processing of the print (New Year's card, calendar, etc.) and a print size, the screen is changed over to indicate different kinds of producing edges of a print, and when the operator selects a specified one, the screen is further changed over.

However, for example, after an operator selects a mode of processing of the print and a print size, at the timing when the kinds of producing edges of a print are indicated on the screen, in some cases the operator interrupts the operation for a while. In such cases, if the time until his returning to the operation is comparatively long, it is possible that the operator forgets which mode of processing and print size he has selected. Another embodiment for solving such a problem of going out of order will be explained.

Figure 17:
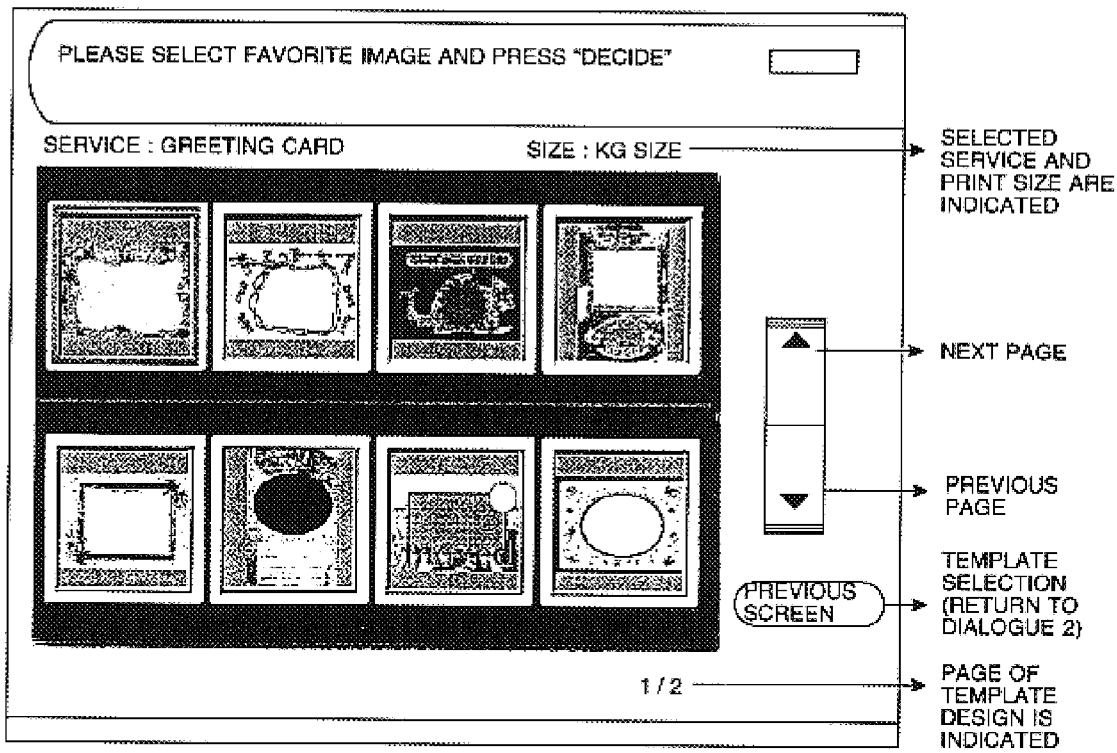
FIG. 17 is a drawing showing a screen on the monitor display provided in this image processing system, and is a drawing showing the dialogue screen for selecting a template.

FIG. 17 is a drawing showing a screen of a display, which is the above-mentioned another embodiment. As shown in FIG. 17, eight kinds of producing edges of a print are indicated, and further, over them, 'greeting card' is indicated for the content of service as the mode of processing and 'KG size' is also indicated for the print size, both of which the operator has already selected. Accordingly, an operator who has seen this display can immediately grasp that the desired print is a greeting card of KG size even after an interruption of the operation, by which it is made possible to enhance the efficiency of inputting information. Further, in order to display modes of processing and print sizes, it may be appropriate to use not letters but signs or figures.

Figure 13:
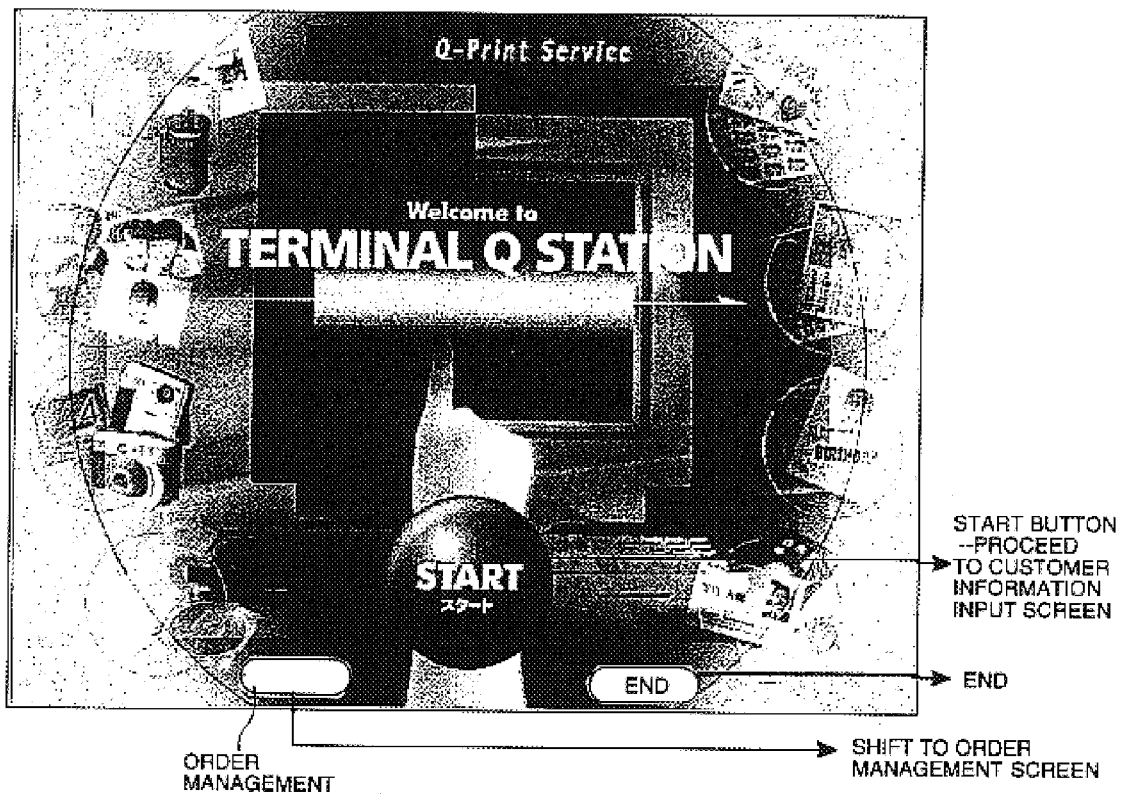
FIG. 13 is a drawing showing a screen on the monitor display provided in this image processing system, and is a drawing showing the starting screen.

Further, the operation of an image processing system comprising an image processing apparatus of this embodiment will be explained. FIG. 13 is a drawing showing a screen of the monitor display provided in this image processing system. First, by pressing the start button, the start screen shown in FIG. 13 is indicated on the monitor display. Now, each button will be explained:

The start button: a button for starting the operation of the image processing system.

Order management: a button for proceeding to the screen of "order management" by which the situation of the operation for the orders which have been received already can be confirmed. Further, by the screen "order management", the following operation can also be performed: deleting the image data and the order information which have already become unnecessary, re-input of an image, re-processing of an image, and re-printing of a prepared image.

Finish: a button for finishing the image processing system, and returning to the screen of 'Windows'.

Figure 14:
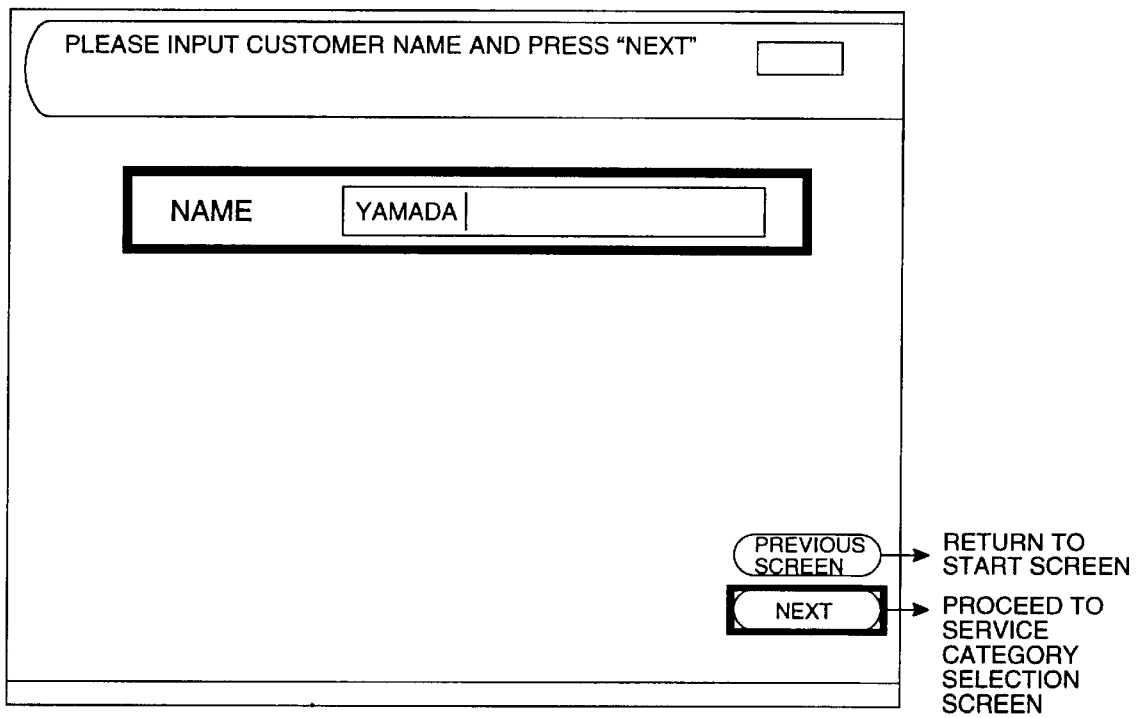
FIG. 14 is a drawing showing a screen on the monitor display provided in this image processing system, and is a drawing showing the screen for inputting customer information.

FIG. 14 is a drawing showing a screen of the monitor display provided in an image processing apparatus of this embodiment, and is a drawing showing the screen for inputting customer information. To explain the detail of the operation, first the name of the customer is inputted, and then by pressing "next", an operator can proceed to the next screen. At this time, the box for the customer's name and the "next" button are indicated flashing. Further, the explanation of every button is as follows:

"previous screen": a button for returning to the start screen; and

"next": a button for proceeding to the screen for selecting a service category.

Figure 15:
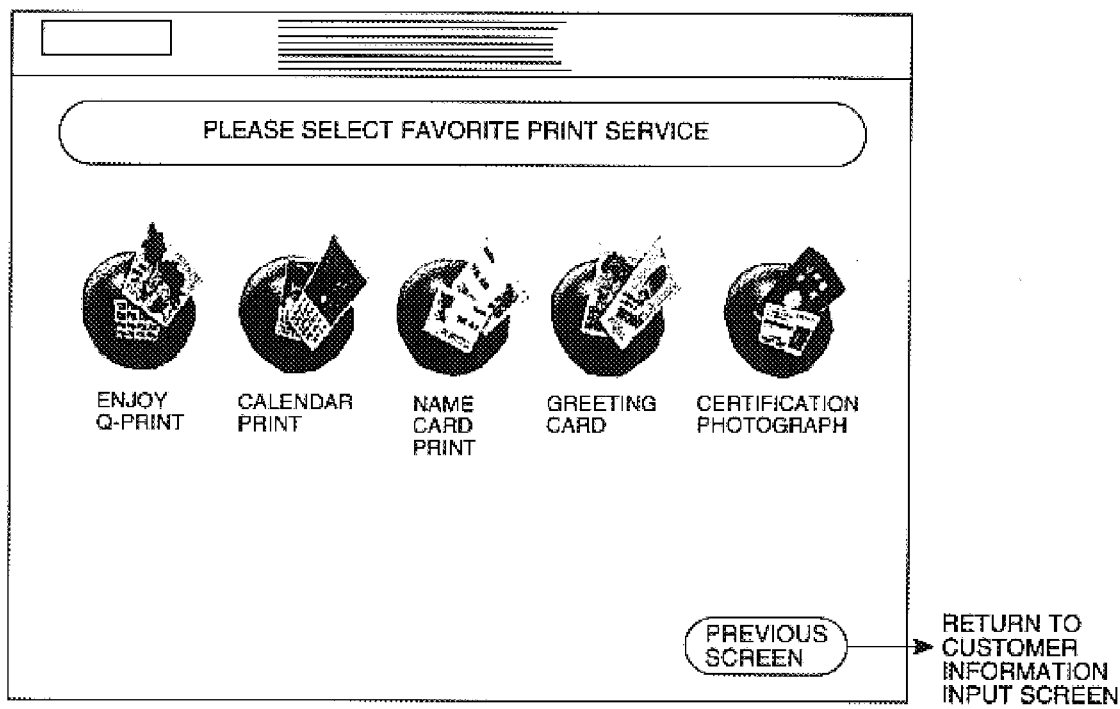
FIG. 15 is a drawing showing a screen on the monitor display provided in this image processing system, and is a drawing showing the screen for selecting a service category.

FIG. 15 is a drawing showing a screen of the monitor display provided in an image processing apparatus of this embodiment, and is a drawing showing the screen for selecting a service category. To explain the detail of the operation, first, by selecting a desired service category, an operator can proceed to each print service operation. For the template image data to be used in each service, the data in a CD-ROM are used. In the case where the CD-ROM including the selected service category is not inlaid, the message "please set the proper CD-ROM" is indicated.

Next, the explanation of the function of every button is as follows:

"enjoy Q-print: capable of producing a layout print by inlaying an image into a template of A4 size and of A3 size;

"calendar print": capable of producing a calendar print by inlaying an image into a template of FD-case size, a pocketbook size, KG size, 2L size, one sixth size, A4 size, and A3 size;

"name card print" (visiting card print): capable of producing a name card by inlaying an image into a template for a name card;

"greeting card": capable of producing a greeting card by inlaying an image into a template of KG size, 2L size, and a special size;

"certification photograph": capable of producing a photograph for a normal driver's license, a passport application, an overseas driver's license, a visa, and a personal history; and "previous screen": a button for returning to the screen for inputting customer information.

Figure 16:
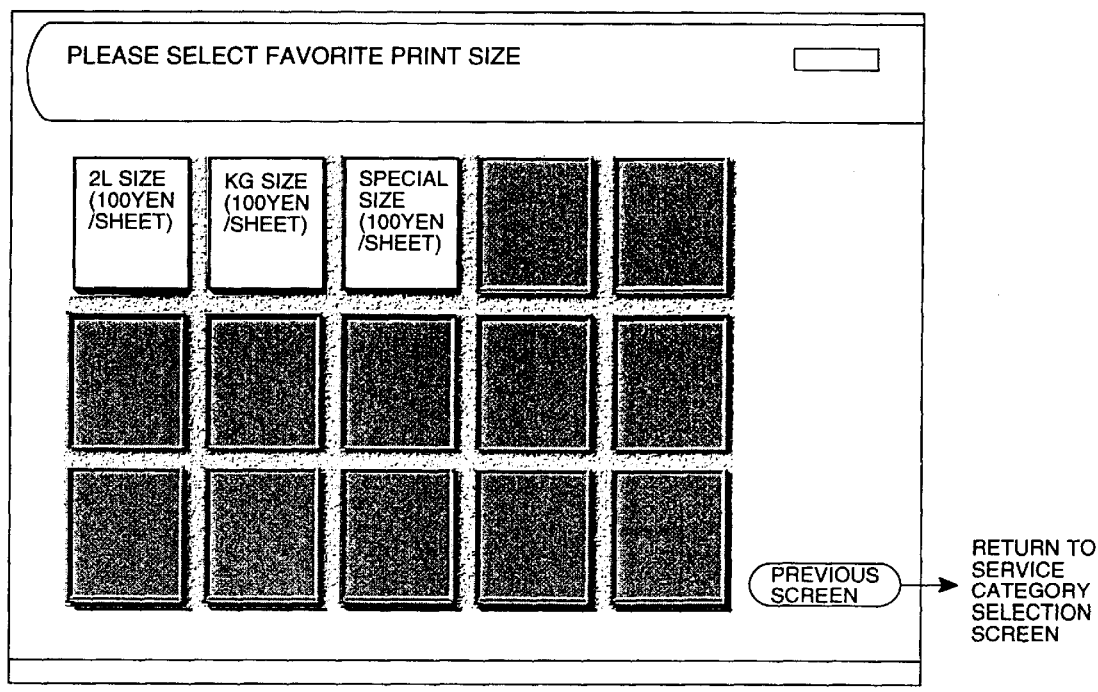
FIG. 16 is a drawing showing a screen on the monitor display provided in this image processing system, and is a drawing showing the dialogue screen for selecting a template.

FIG. 16 is a drawing showing a screen of the monitor display provided in an image processing apparatus of this embodiment, and is a drawing showing the dialogue screen for selecting a template. To explain the detail of the operation, the print sizes for producing a print in the category which has been selected on the screen for selecting a service category are indicated on the buttons respectively, and at the same time, the prices of the respective prints are also indicated. By pressing the desired print size button, the print size can be selected. Besides, the print prices indicated on the respective buttons can be set by an 'ini' file (for the detail, please refer to 'environment setting').

The explanation of the button is as follows:

"previous screen": a button for returning to the screen for selecting a service category.

FIG. 17 is a drawing showing a screen of the monitor display provided in an image processing apparatus of this embodiment, and is a drawing showing the dialogue screen for selecting a template. To explain the detail of the operation, the template designs (thumbnail images) are indicated together with the selected service category and print size. By pressing the desired template design button, the design can be selected.

The explanation of the function of every button is as follows:

"previous screen": for returning to the screen for selecting a service category; and "page turning button": an operator can watch the template designs of the next page or the previous page.

Figure 18:
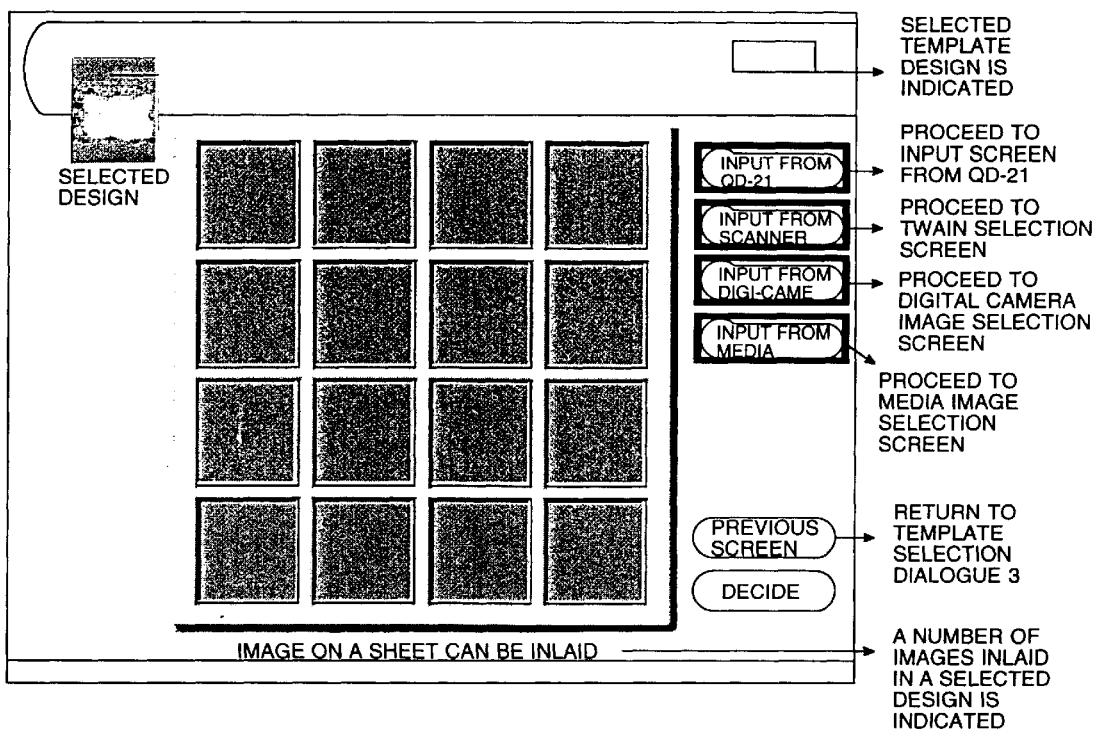
FIG. 18 is a drawing showing a screen on the monitor display provided in this image processing system, and is a drawing showing the screen for obtaining an input image.

FIG. 18 is a drawing showing a screen of the monitor display provided in an image processing apparatus of this embodiment and is a drawing showing the screen for obtaining an input image. To explain the detail of the operation, an image from the film scanner of the QD-21, a separately installed scanner connected to an external PC (such as a flat-bed scanner), a digital camera (PCMCIA card), or a medium (such as an FD, an MO, a CD-ROM, a CD-R, or an HD) can be inputted. Further, on the screen, "input from QD-21", "input from a scanner", "input from a digital camera", and "input from a medium" are indicated flashing.

The explanation of the function of every button is as follows:

"input from QD-21": for inputting an image from the film scanner of QD-21 (a flat-bed scanner);

"input from a scanner": for inputting an image from a separately installed scanner connected to an external PC;

"input from a digital camera": for inputting an image from a digital camera (PCMCIA);

"input from a medium": for inputting an image from a medium (such as an FD, an MO, a CD-ROM, a CD-R, or an HD); and "previous screen": for returning to the dialogue 3 for selecting a template.

Figure 19:
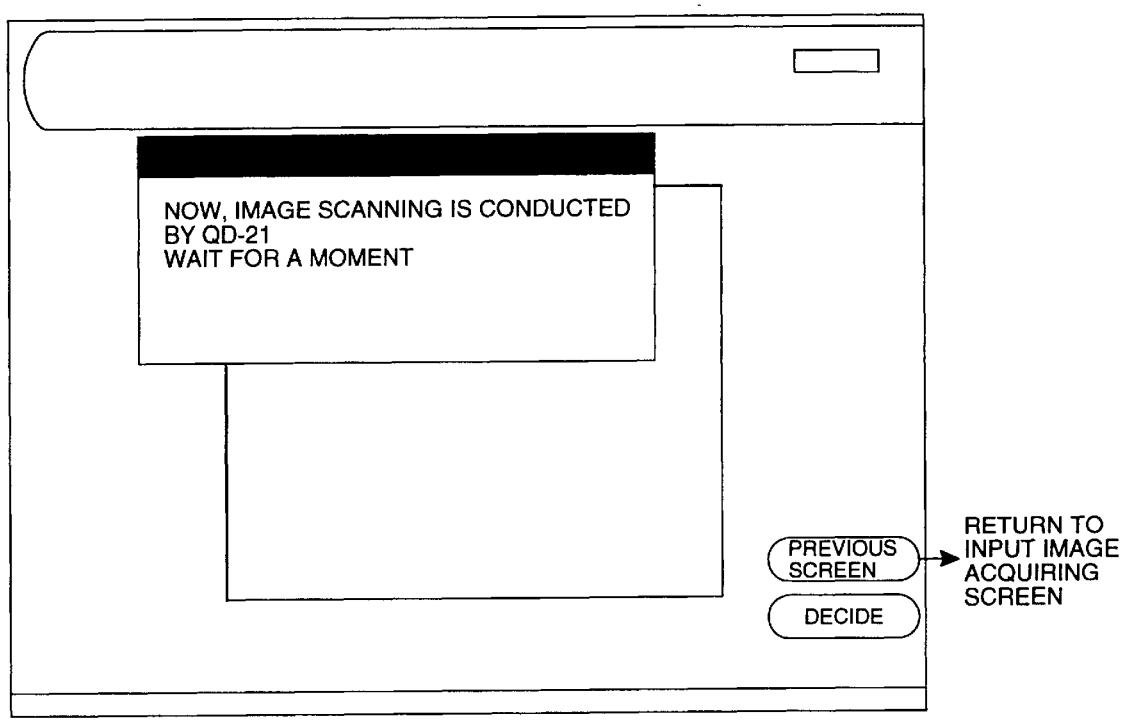
FIG. 19 is a drawing showing a screen on the monitor display provided in this image processing system, and is a drawing showing the input screen from QD-21.

FIG. 19 is a drawing showing a screen of the monitor display provided in an image processing apparatus of this embodiment and is a drawing showing the screen for inputting an image from QD-21. To explain the detail of the operation, as shown in FIG. 19, "image is now being scanned by QD-21; please wait for a while" is indicated until the image scanning in QD-21 is finished. When the image scanning in QD-21 is finished, "image scanning in QD-21 is finished" is indicated.

The explanation of the function of every button is as follows:

"previous screen": for returning to the screen for obtaining an input image; and "decide": for proceeding to the next screen.

FIG. 20 is a drawing showing a screen of the monitor display provided in an image processing apparatus of this embodiment and is a drawing showing the screen for selecting 'TWAIN'. To explain the detail of the operation, on the screen in FIG. 20(a), by pressing the "select a scanner" button, it is changed over to the screen shown in FIG. 20(b). Further, in FIG. 20(a), "select a scanner" is indicated flashing. In FIG. 20(b), the dialogue for selecting a kind of a scanner is indicated; then, here the kind of the scanner to be used is selected.

Figure 21:
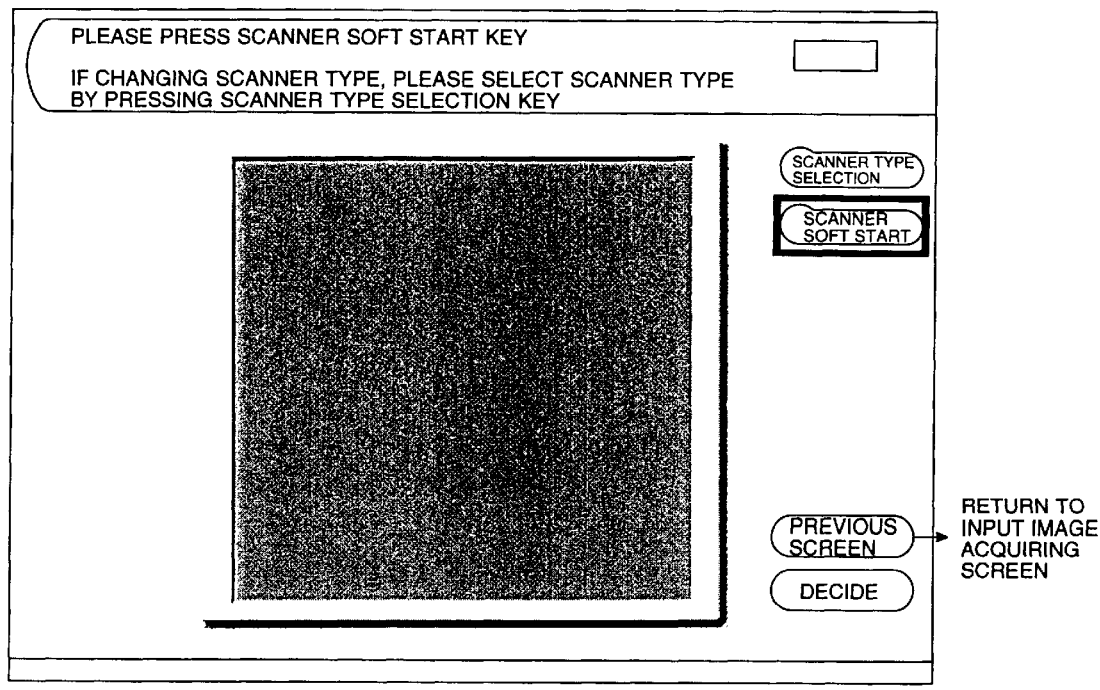
FIG. 21 is a drawing showing a screen on the monitor display provided in this image processing system, and is a drawing showing the screen for selecting 'TWAIN'.

FIG. 21 is a drawing showing a screen of the monitor display provided in an image processing apparatus of this embodiment and is a drawing showing the screen for selecting 'TWAIN'. To explain the detail of the operation, by pressing the button "start scanner soft", the scanner driver software is started. Besides, on the screen, "start scanner soft" is indicated flashing.

The explanation of the function of every button is as follows:

"selecting a scanner": to be pressed for indicating the dialogue for selecting the kind of the scanner, when change over of the kind of the scanner is desired;

"start scanner soft" for starting the driver software of the selected scanner; and "previous screen": for returning to the screen for obtaining an input image.

Figure 22:
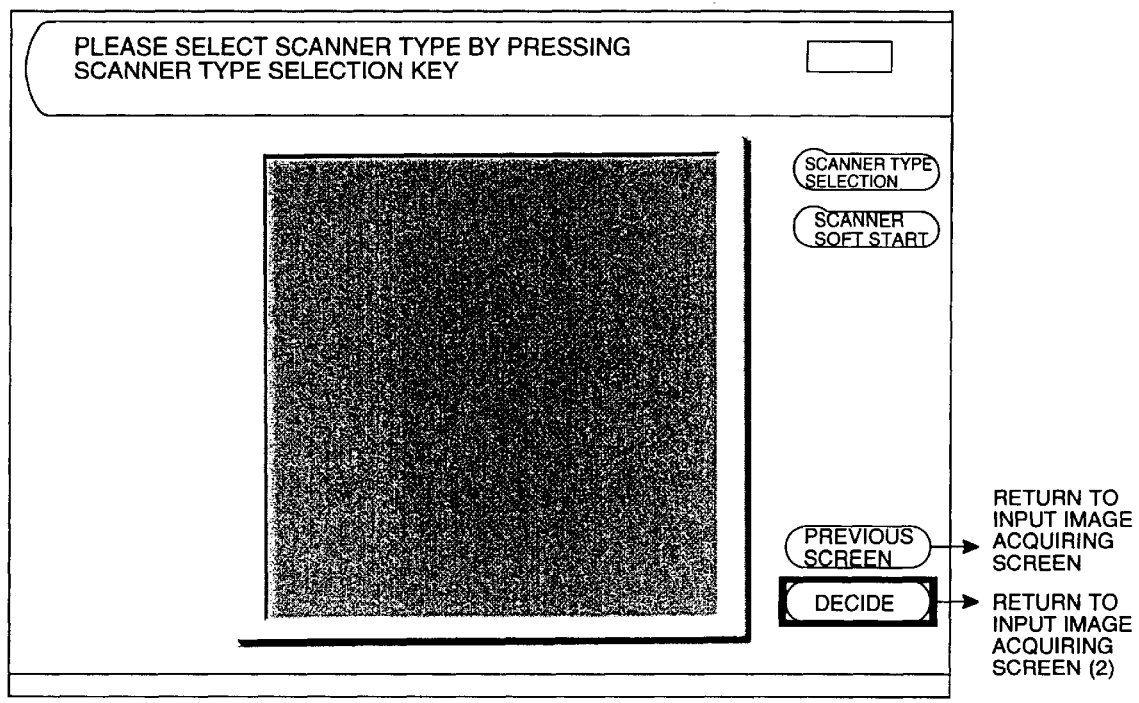
FIG. 22 is a drawing showing a screen on the monitor display provided in this image processing system, and is a drawing showing the screen for selecting 'TWAIN'.

FIG. 22 is a drawing showing a screen of the monitor display provided in an image processing apparatus of this embodiment and is a drawing showing the screen for selecting 'TWAIN'. To explain the detail of the operation, the scanned image is indicated after the operation in the selected scanner is finished. If the selected image is of no problem, by pressing the button "decide", the scanned image is obtained as the input image, and it is indicated on the screen for obtaining an input image.

The explanation of the function of every button is as follows:

"select a scanner": to be pressed for indicating the dialogue for selecting the kind of the scanner, when change over of the kind of the scanner is desired;

"start scanner soft": for starting the driver software of the selected scanner; and "previous screen": for returning to the screen for obtaining an input image.

"decide": for obtaining the scanned image as the input image to indicate it on the screen for obtaining an input image (2).

Figure 23:
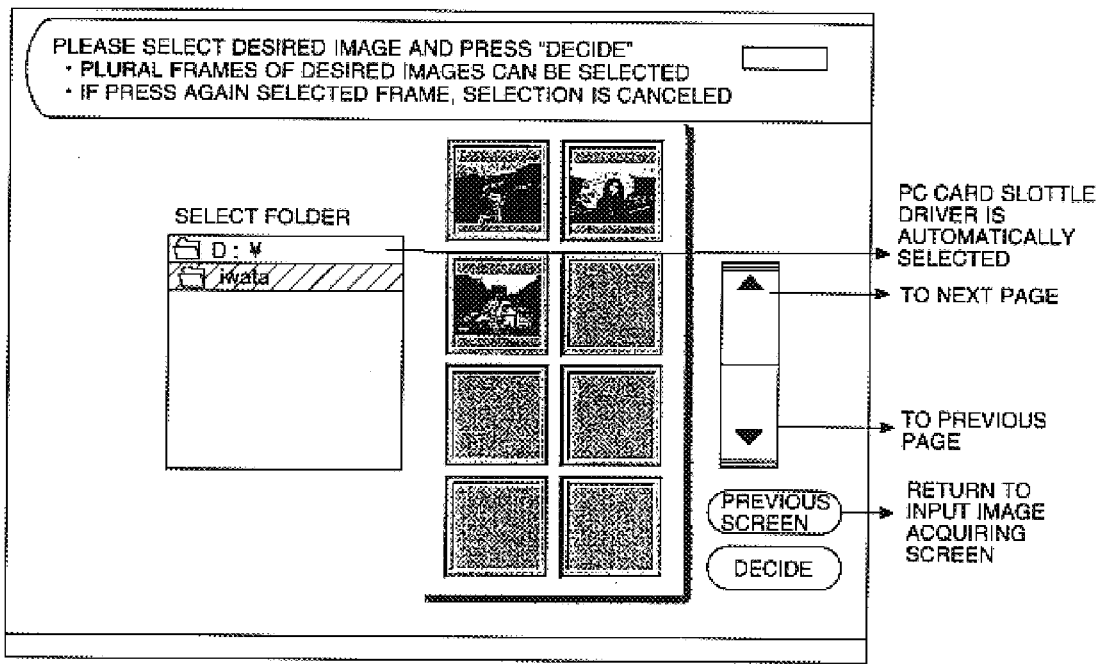
FIGS. 23(a) and 23(b) are drawing showing a screen on the monitor display provided in this image processing system, and is a drawing showing the screen for inputting an image from a digital still camera.
Figure 23:
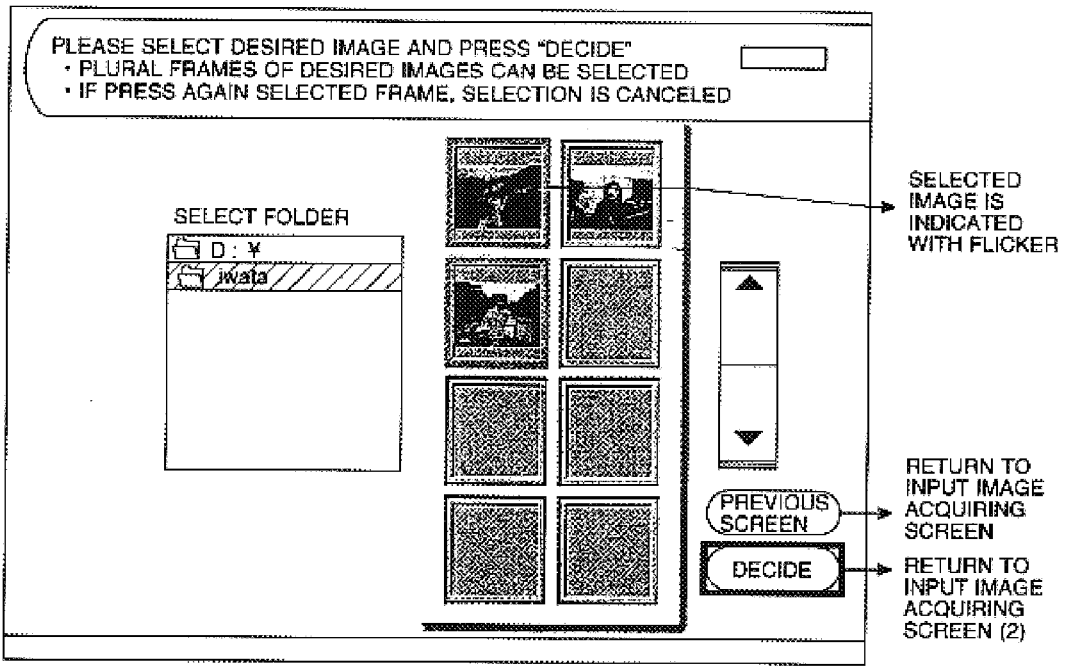

FIG. 23 is a drawing showing a screen of the monitor display provided in an image processing apparatus of this embodiment and is a drawing showing the screen for inputting an image from a digital still camera. To explain the detail of the operation, by selecting "input from a digital camera" on the screen for obtaining an input image, the PC card throttle drive is automatically selected on the above-mentioned screen; then, by designating a folder in the PC card, thumbnail images photographed by the digital camera are indicated (FIG. 23(a)).

At this time, by pressing an image which the operator wishes to input, the image is made to be indicated flashing as shown in FIG. 23(b). As for the image which the operator wishes to input, a plurality of frames can be selected at the same time, and if he presses the one of the selected frames, the selection of it is cancelled. When the selection of the images which the operator wishes to input is finished, he can proceed to the screen for obtaining an input image (2) by pressing the button "decide" (FIG. 25).

Figure 24:
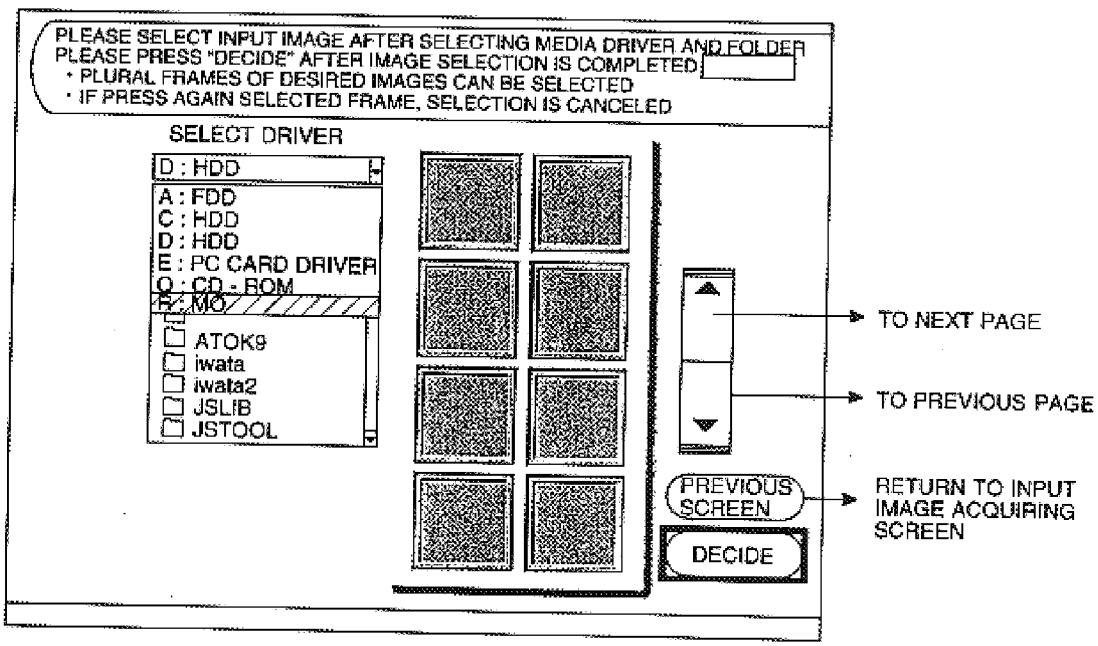
FIGS. 24(a) and 24(b) are drawing showing a screen on the monitor display provided in this image processing system, and is a drawing showing the screen for inputting an image from a digital still camera.
Figure 24:
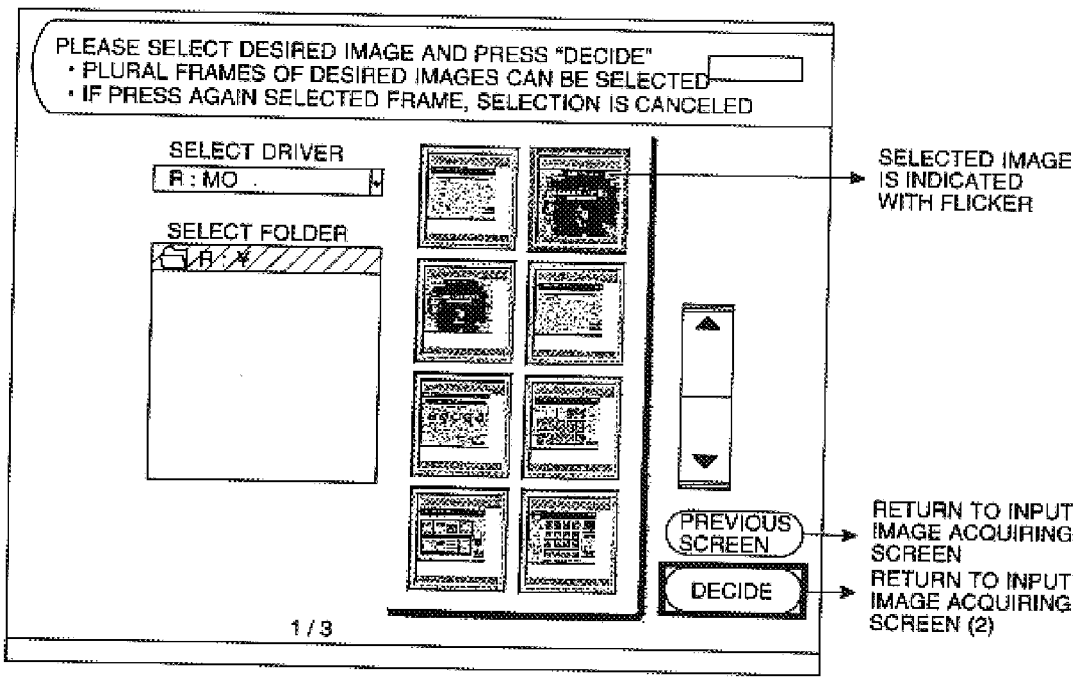

FIG. 24 is a drawing showing a screen of the monitor display provided in an image processing apparatus of this embodiment and is a drawing showing the screen for inputting an image from a digital still camera. To explain the detail of the operation, by selecting a medium drive and a folder, thumbnail images in the designated folder are indicated (FIG. 24(a)).

At this time, by pressing an image which the operator wishes to input, the image is made to be indicated flashing as shown in FIG. 24(b). As for the image which the operator wishes to input, a plurality of frames can be selected at the same time, and if he presses the one of the selected frames, the selection of it is cancelled when the selection of the images which the operator wishes to input is finished, he can proceed to the screen for obtaining an input image (2) by pressing the button "decide" (FIG. 25).

Figure 25:
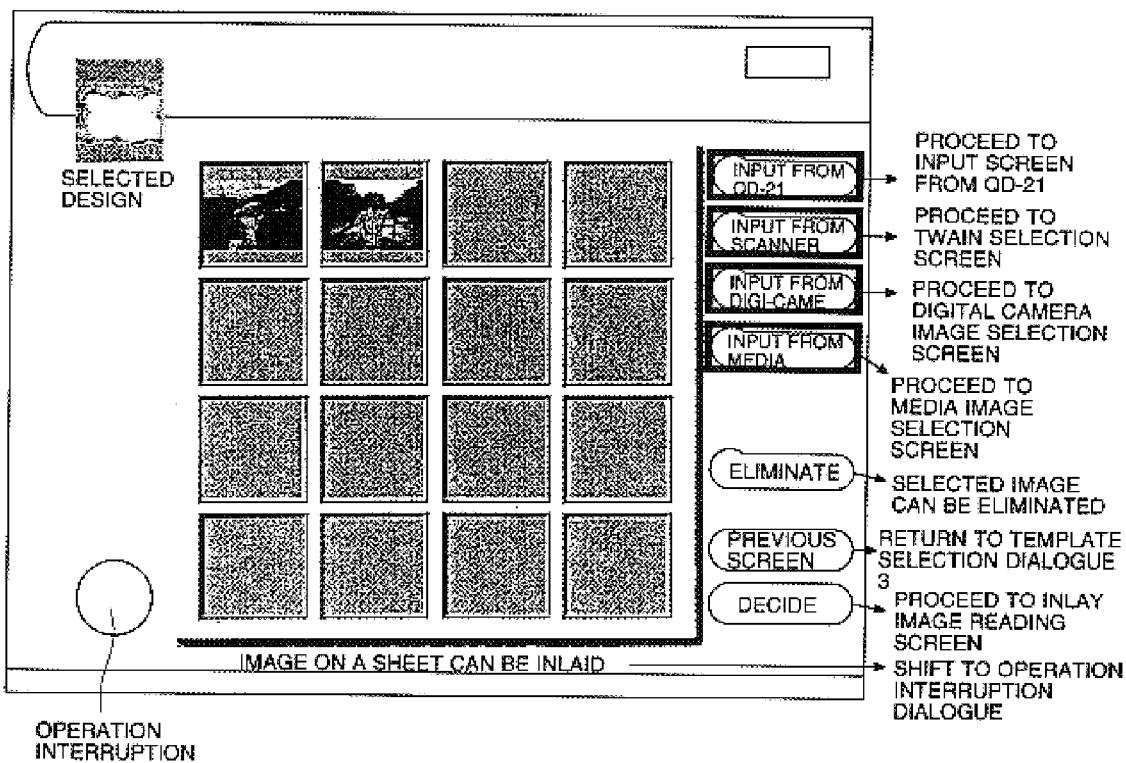
FIG. 25 is a drawing showing a screen on the monitor display provided in this image processing system, and is a drawing showing the screen for obtaining an input image.

FIG. 25 is a drawing showing a screen of the monitor display provided in an image processing apparatus of this embodiment and is a drawing showing the screen for obtaining an input image. To explain the detail of the operation, the selected images are put together and indicated on the screen for obtaining an input image. In the case where the operator further continue to input an image, by selecting one of "input from QD-21", "input from a scanner", "input from a digital camera", and "input from a medium", he can input images additionally by similar operation.

On the other hand, in the case where an operator wishes to eliminate an image which he has already inputted, he should select an image which he wishes to eliminate and press the button "eliminate". By doing this, the image selected is made to be indicated flashing. If the inputted images are suitable, he has only to press the "decide" button. Further, in the case where the number of the inputted images is smaller than the number of the windows (masks) of the template, the display "the number of input images is smaller than the number of the template masks; is it OK?" is indicated.

The explanation of the function of every button is as follows:

"input from QD-21": for additionally inputting an image from the film scanner (a flat-bed scanner) of QD-21;

"input from scanner": for additionally inputting an image from a separately installed scanner connected to an external PC (such as a flat-bed scanner);

"input from digi-came": for additionally inputting an image from a digital camera (a PCMCIA card);

"input from medium": for additionally inputting an image from a medium (an FD, an MO, a CD-ROM, a CD-R, an HD, etc);

"eliminate": to be pressed for deleting an image which has already been inputted, after selecting an image to be eliminated;

"previous screen": for returning to the dialogue for selecting a template (FIG. 17); and (By returning to the dialogue for selecting a template, images which have been inputted already are made ineffective.)

"interrupt operation": for interrupting the operation here (for further details of this, refer to the next page).

Figure 26:
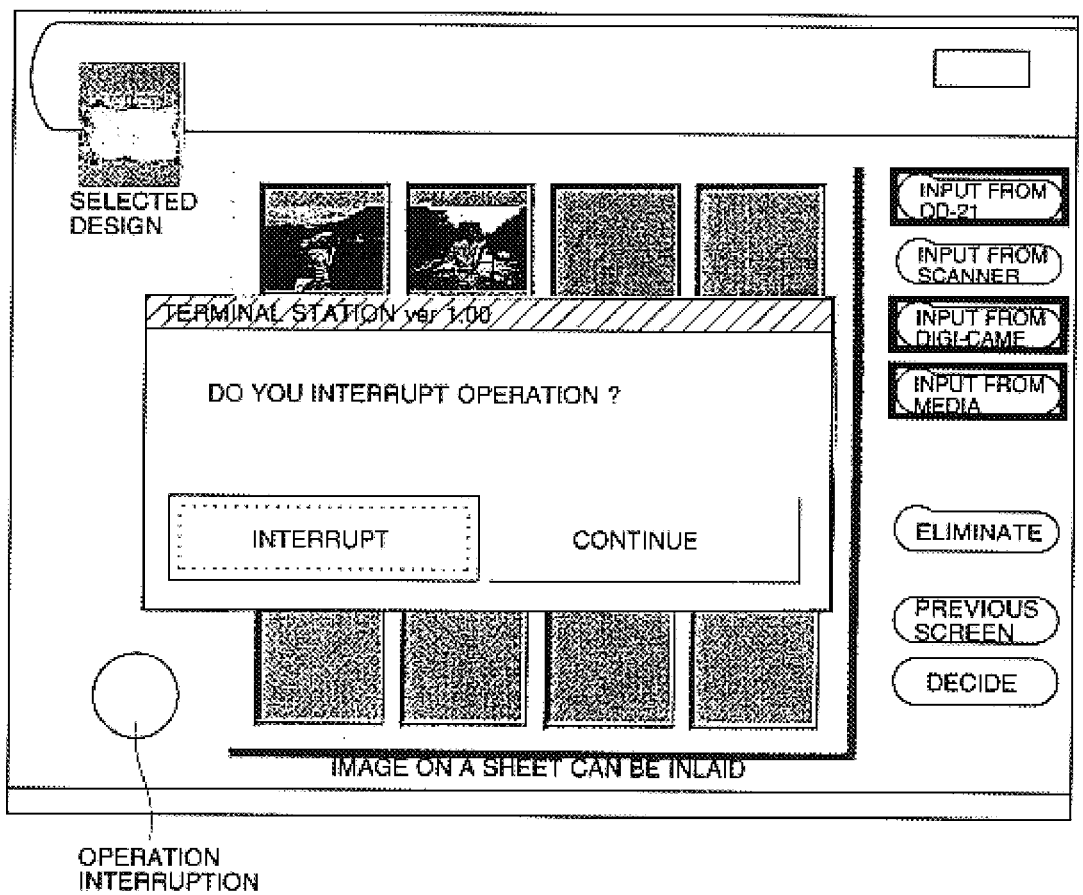
FIG. 26 is a drawing showing a screen on the monitor display provided in this image processing system, and is a drawing showing the dialogue screen for interrupting an operation.

FIG. 26 is a drawing showing a screen of the monitor display provided in an image processing apparatus of this embodiment and is a drawing showing the dialogue screen for interrupting the operation. To explain the detail of the operation, in the case where "interrupt" is selected, an operator can return to the start screen with the images which have been inputted by the operation carried out until this time stored in a folder which is exclusive to the customer. On the other hand, when the operator wishes to re-start the operation (beginning with the image inlaying operation), the operation can be started again by pressing the "order management" button on the start screen. Further, also in the case where the operator wishes to eliminate the order of this customer, it is eliminated by pressing the "order management" button. For the further details, the screen for order management should be referred to.

Figure 27:
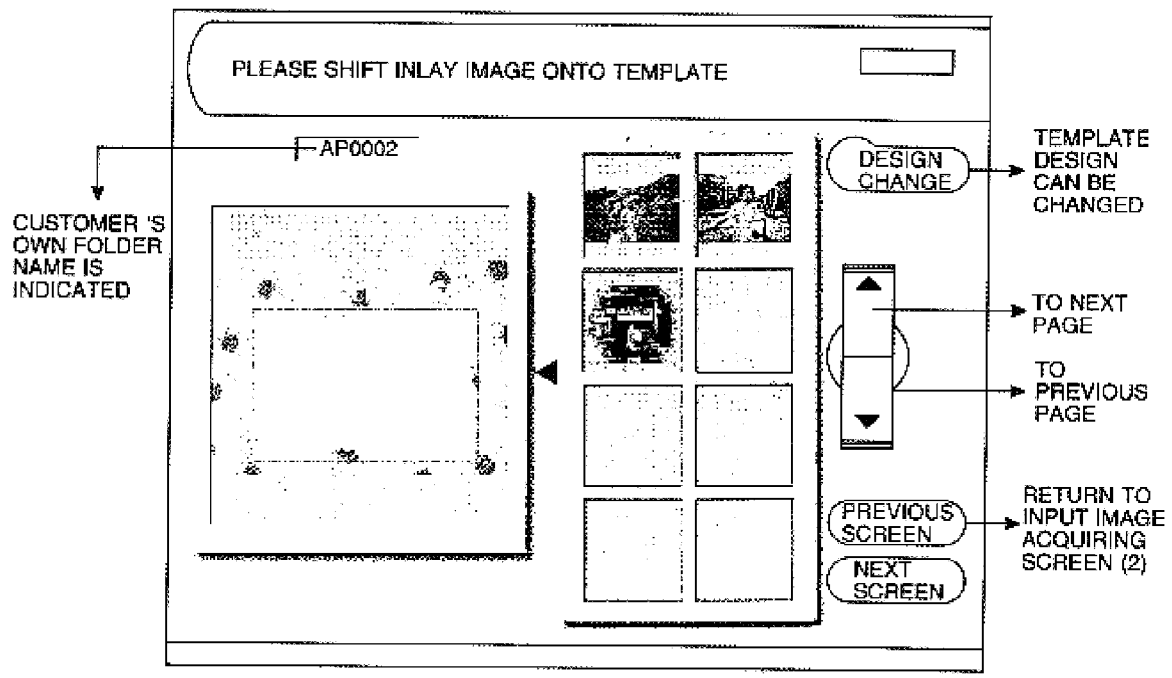
FIGS. 27(a) and 27(b) are drawing showing a screen on the monitor display provided in this image processing system, and is a drawing showing the screen for reading an image to be inlaid.
Figure 27:
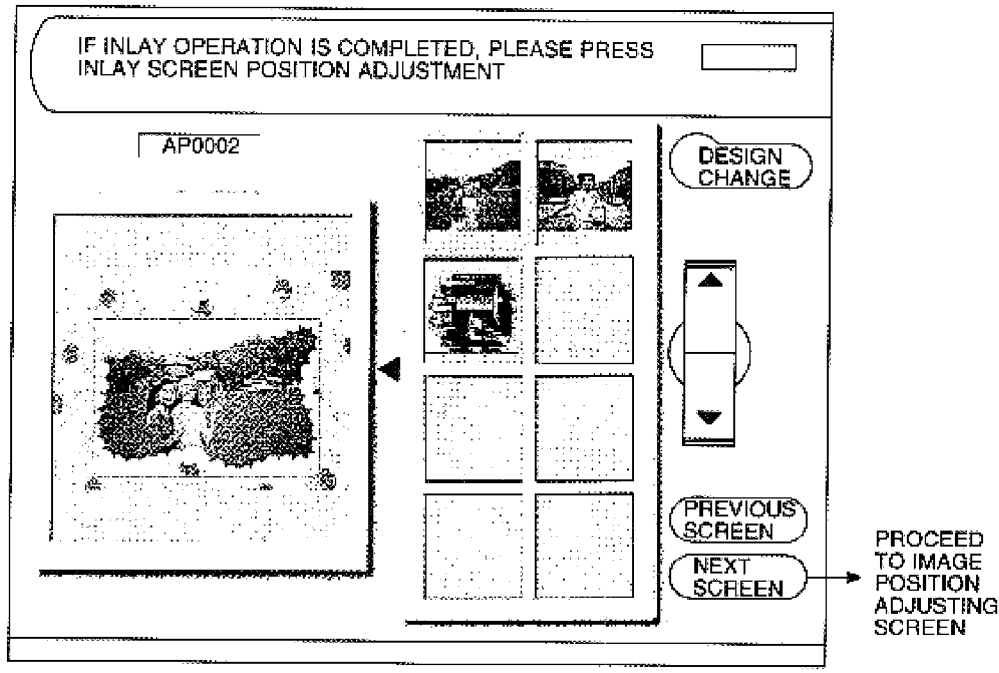

FIG. 27 is a drawing showing a screen of the monitor display provided in an image processing apparatus of this embodiment and is a drawing showing the screen for reading an image to be inlaid. To explain the detail of the operation, the image which an operator wishes to inlay should be moved (dragged) to the position for inlaying the image on the template. When the operator wishes to change an image which has already been inlaid to another image, the image can be changed by dragging the another image to the position for inlaying the image on the template (FIG. 27(a)).

Further, in this screen, it is not possible to adjust the position of an inlay image. When inlay of images to all the positions for inlaying an image on the template is finished, the "next screen" button should be pressed (FIG. 27(b).

Figure 28:
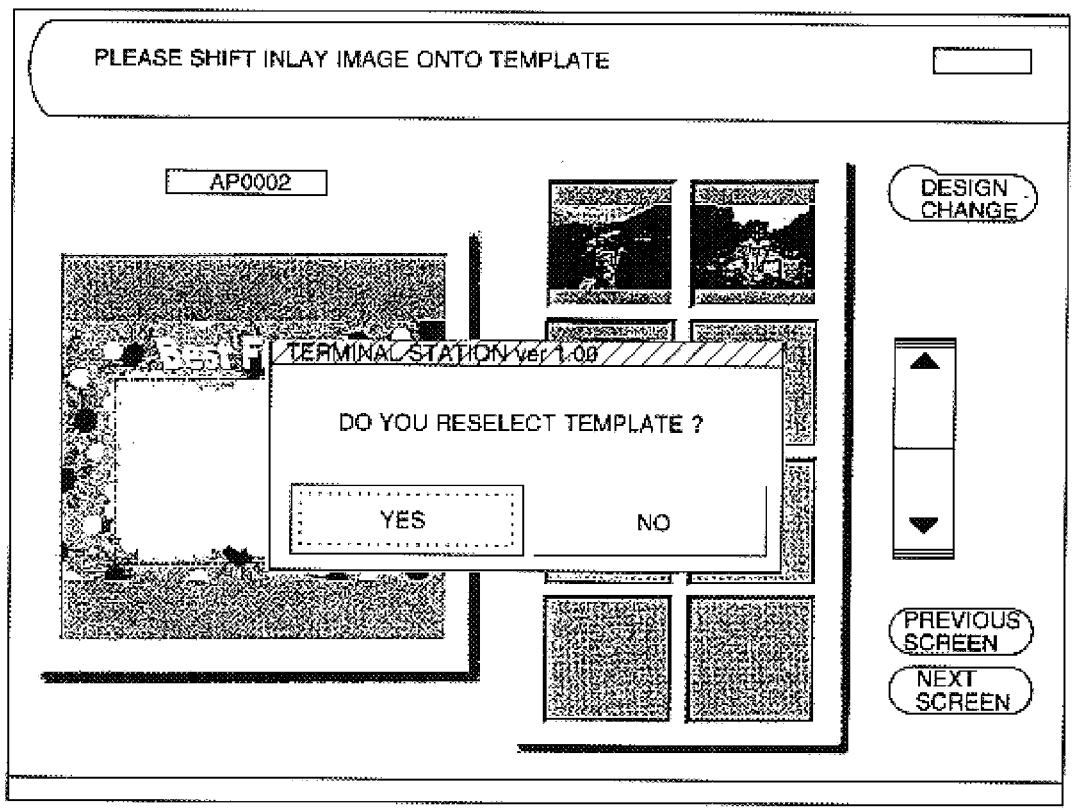
FIG. 28 is a drawing showing a screen on the monitor display provided in this image processing system, and is a drawing showing the screen for reading an image to be inlaid.

FIG. 28 is a drawing showing a screen of the monitor display provided in an image processing apparatus of this embodiment and is a drawing showing the screen for reading an image to be inlaid. To explain the detail of the operation, by pressing the "Yes" button, an operator moves to the screen for selecting a service category, and he can select over again a template from the service category.

Figure 29:
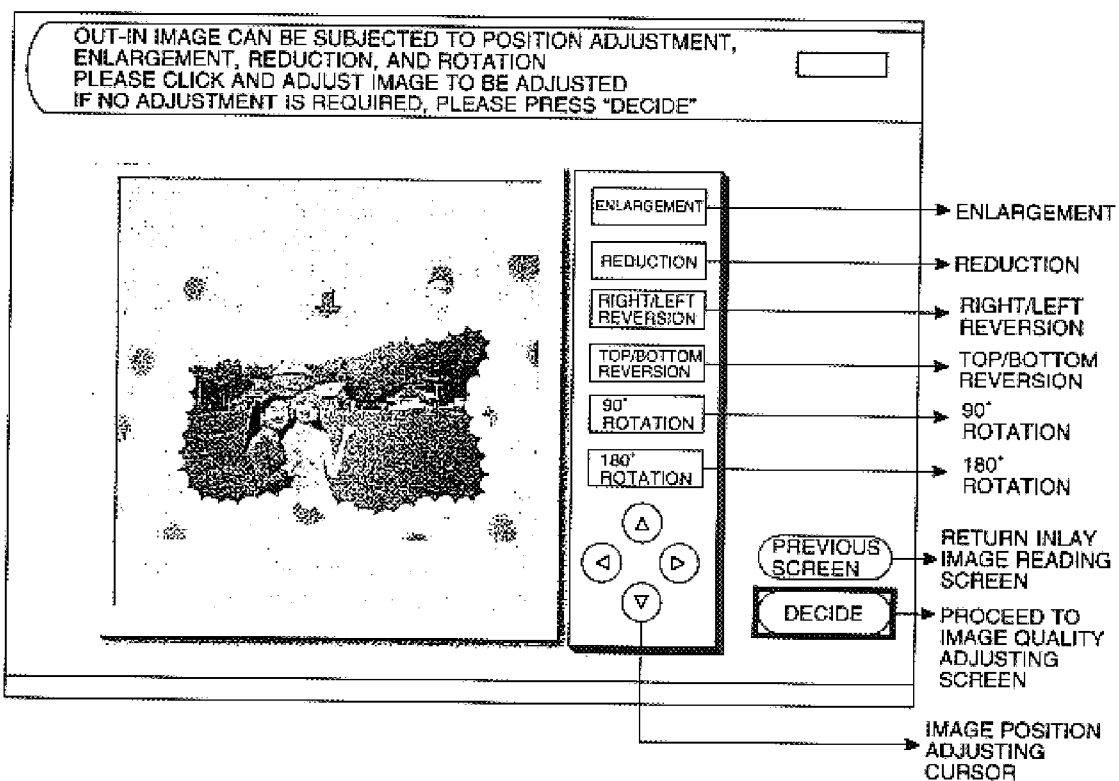
FIG. 29 is a drawing showing a screen on the monitor display provided in this image processing system, and is a drawing showing the screen for adjusting the position of an image to be inlaid.

FIG. 29 is a drawing showing a screen of the monitor display provided in an image processing apparatus of this embodiment and is a drawing showing the screen for adjusting the position of an inlay image. To explain the detail of the operation, by pressing the operation buttons, an operator can carry out the adjusting of the position, enlargement, reduction, inverting left to right, inverting top down, and rotation of the image. For the adjustment of the position of an inlay image, it can be done by a mouse and the cursor for adjusting an image position on the screen.

The explanation of the function of every button is as follows:

"enlargement": for enlarging an image inlaid;
"reduction": for reducing an image inlaid; (Further, because a limit is set in order that the size of an image may not be made smaller than the size of the mask, in the case where the image can not be made smaller than already made, the display "this image can be no more reduced" is indicated.) "right/left reversion": for reversing an inlay image left to right;
"top/bottom reversion": for reversing an inlay image top bottom;
90° rotation": for rotating an inlay image by 90°;
"180° rotation": for rotating an inlay image by 180°;
"previous screen": for returning to the screen for reading an inlay image; and
"decide": for proceeding to the screen for adjusting image quality.

Figure 30:
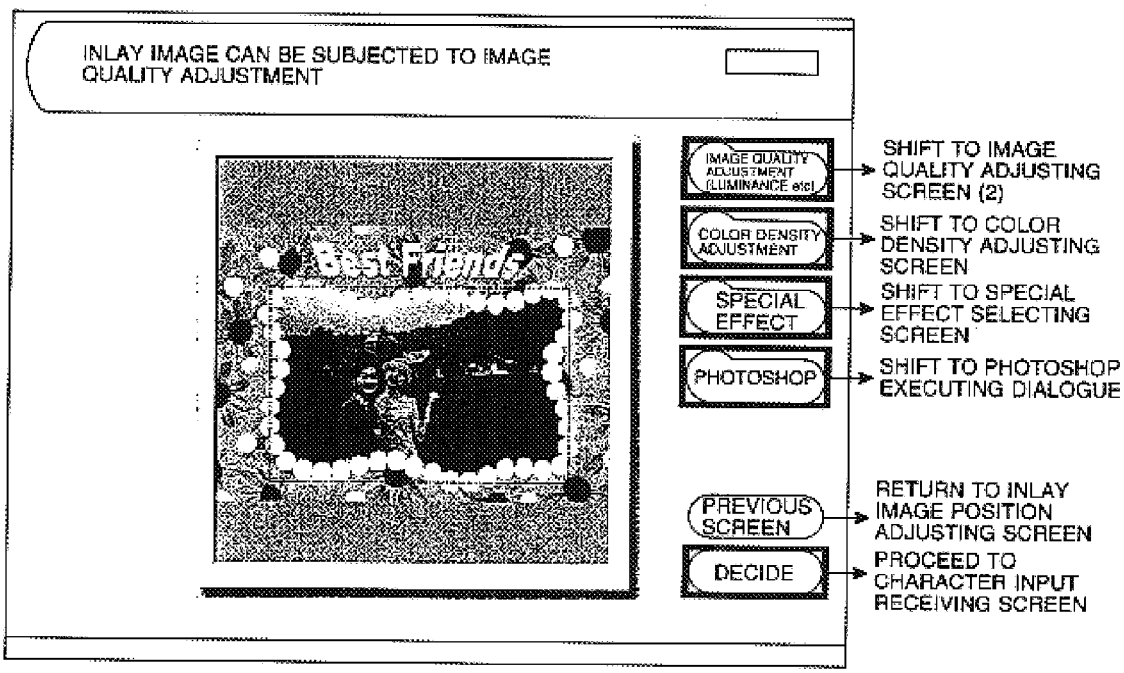
FIG. 30 is a drawing showing a screen on the monitor display provided in this image processing system, and is a drawing showing the screen for adjusting image quality.

FIG. 30 is a drawing showing a screen of the monitor display provided in an image processing apparatus of this embodiment and is a drawing showing the screen for adjusting image quality. To explain the detail of the operation, by pressing the buttons for the respective operations, an operator can carry out the adjustment of image quality (contrast, luminance, and sharpness), the color correction, and the density correction of an inlay image. On top of it, an inlay image can be subjected to a special effect processing (producing monochromatic, blurring). Further, in the case of a personal computer which has already 'Photoshop' installed in it, an inlay image can be processed by 'Photoshop'. By pressing the 'Photoshop' button, 'Photoshop is started, and the operation of 'Photoshop' can be performed with the inlay image opened.

The explanation of the function of every button is as follows:

"adjust image quality": for adjusting the contrast, the luminance, and the sharpness of an inlay image; (moving to the screen for adjusting image quality (FIG. 31))
"adjust color density": for adjusting the color and the density of an inlay image; (moving to the screen for adjusting color density)
"special effect": for giving a special effect (producing monochromatic, blurring, etc.) to an inlay image; (moving to the screen for selecting a special effect)
"Photoshop": for processing an inlay image on 'Photoshop'; (moving to the dialogue for executing 'Photoshop')
"previous screen": for returning to the screen for adjusting the position of an inlay image; and
"decide": for proceeding to the screen for receiving letter input.

Figure 31:
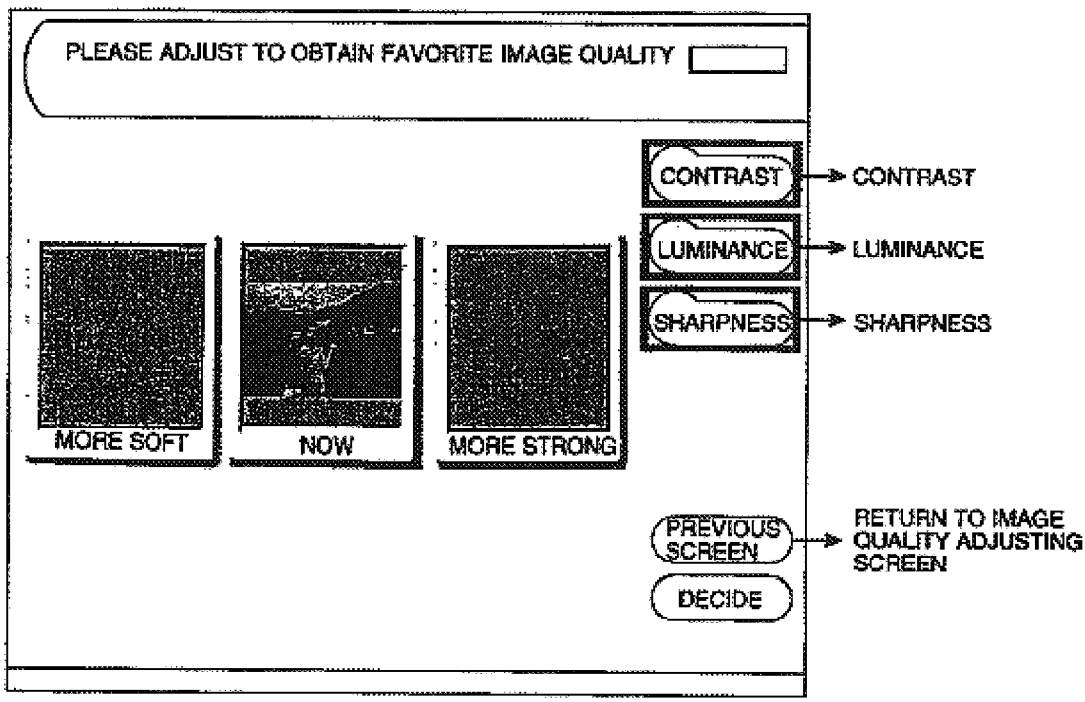
FIGS. 31(a) and 31(b) are drawing showing a screen on the monitor display provided in this image processing system, and is a drawing showing the screen for adjusting image quality.
Figure 31:
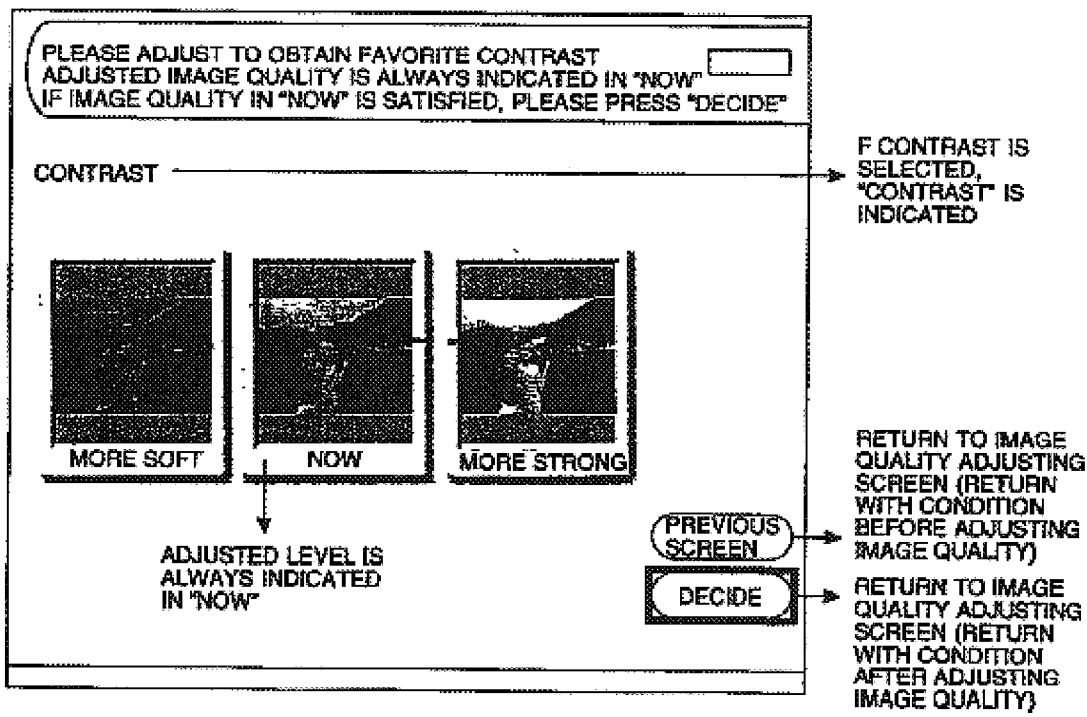

FIG. 31 is a drawing showing a screen of the monitor display provided in an image processing apparatus of this embodiment and is a drawing showing the screen for adjusting image quality. To explain the detail of the operation, by the operation of the buttons, an operator can adjust image quality to fit to the desired one. In FIG. 31(a), one of "contrast", "luminance", and "sharpness" can be selected. For example, if "contrast" is selected, as shown in FIG. 31(b), the images of the level of strengthened contrast, of the level of weakened contrast, and of the present level are indicated. If an operator presses the button for the desired level, the image of the selected level is moved to the present level position. If the operator wishes to vary the level further, he should repeat this operation (the image of the level after adjusting is always indicated on the "present"). If the image of the present level is of no problem, he should press the "decide" button.

Figure 32:
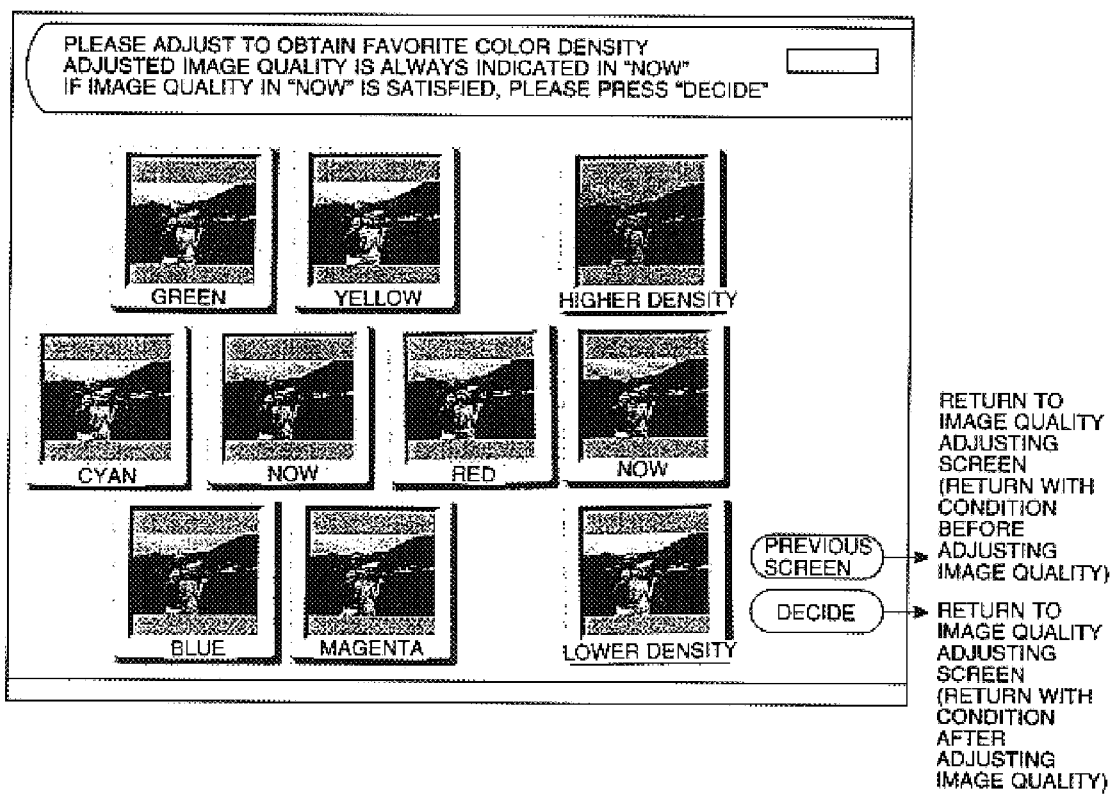
FIG. 32 is a drawing showing a screen on the monitor display provided in this image processing system, and is a drawing showing the screen for adjusting color density.

FIG. 32 is a drawing showing a screen of the monitor display provided in an image processing apparatus of this embodiment and is a drawing showing the screen for adjusting color density. To explain the detail of the operation, an operator can press the buttons of the color and the density he wishes to select. The level after adjusting is always indicated as "present".

Figure 33:
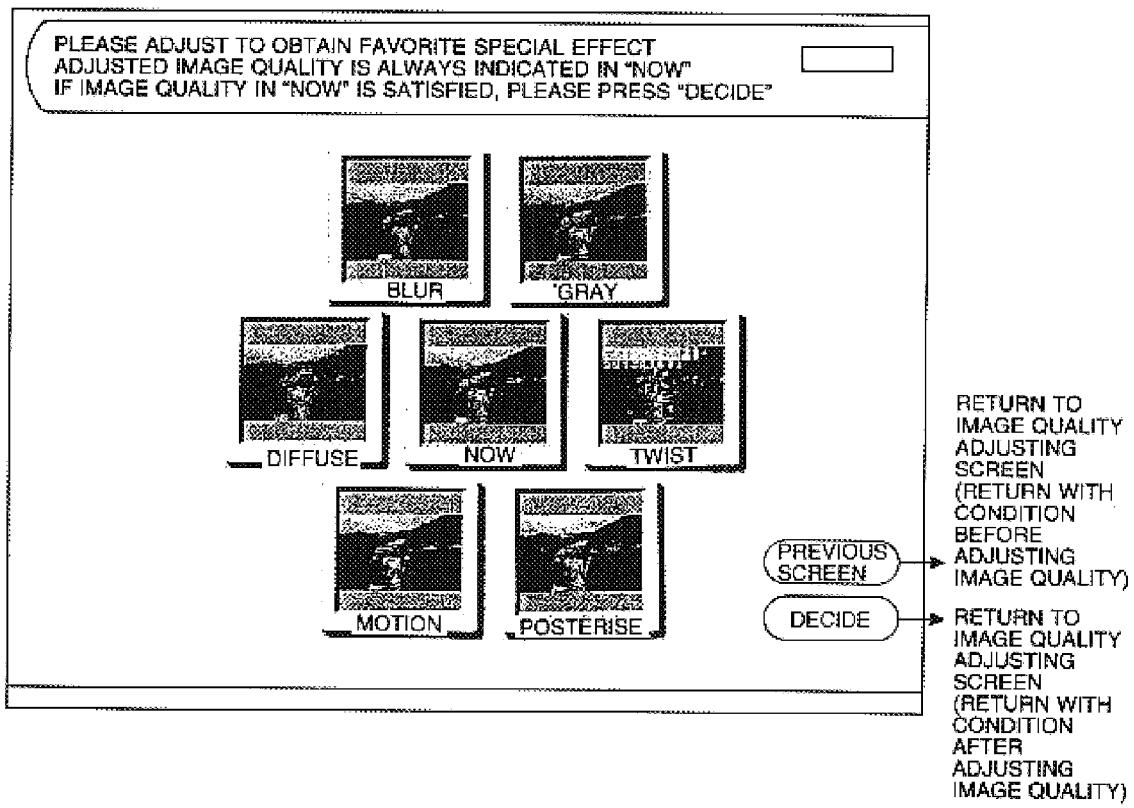
FIG. 33 is a drawing showing a screen on the monitor display provided in this image processing system, and is a drawing showing the screen for selecting a special effect.

FIG. 33 is a drawing showing a screen of the monitor display provided in an image processing apparatus of this embodiment and is a drawing showing the screen for selecting a special effect. To explain the detail of the operation, an operator can press the button of the special effect which he wishes to use. The level after adjusting is always indicated as "present".

Figure 34:
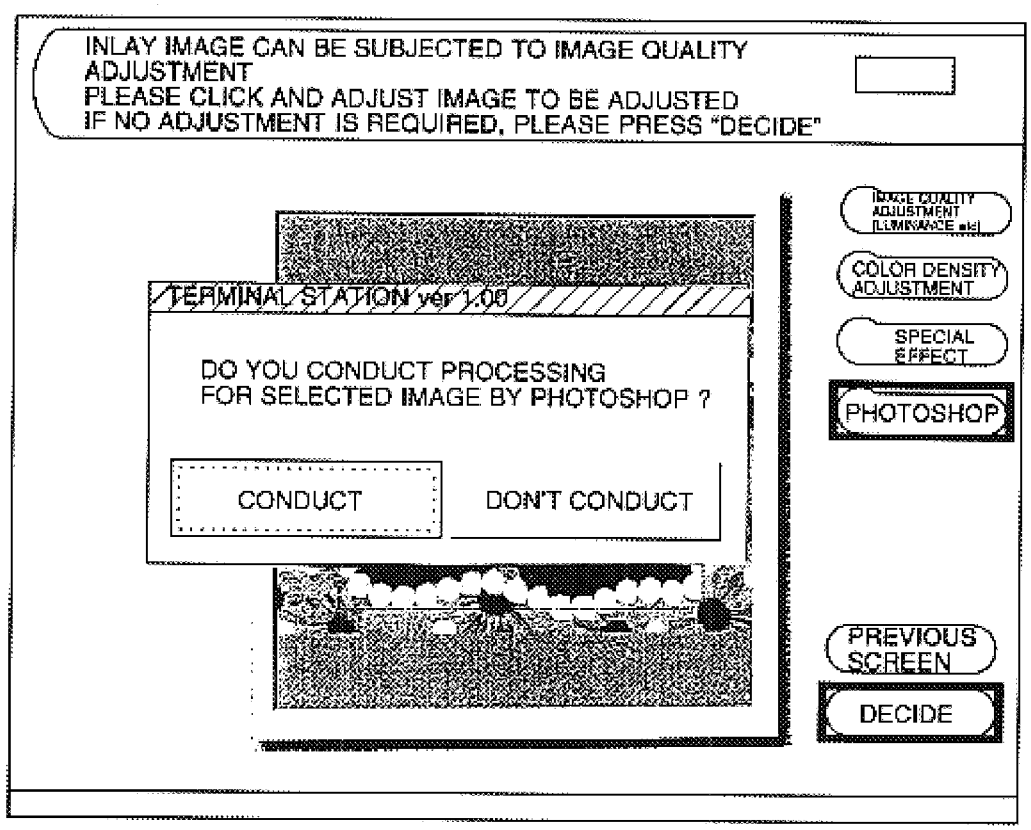
FIG. 34 is a drawing showing a screen on the monitor display provided in this image processing system, and is a drawing showing the dialogue screen for executing 'Photoshop'.

FIG. 34 is a drawing showing a screen of the monitor display provided in an image processing apparatus of this embodiment and is a drawing showing the dialogue screen for executing 'Photoshop'. To explain the detail of the operation, by pressing the button "do", 'Photoshop' is started, and an operator can execute 'Photoshop' with an inlay image opened.

Figure 35:
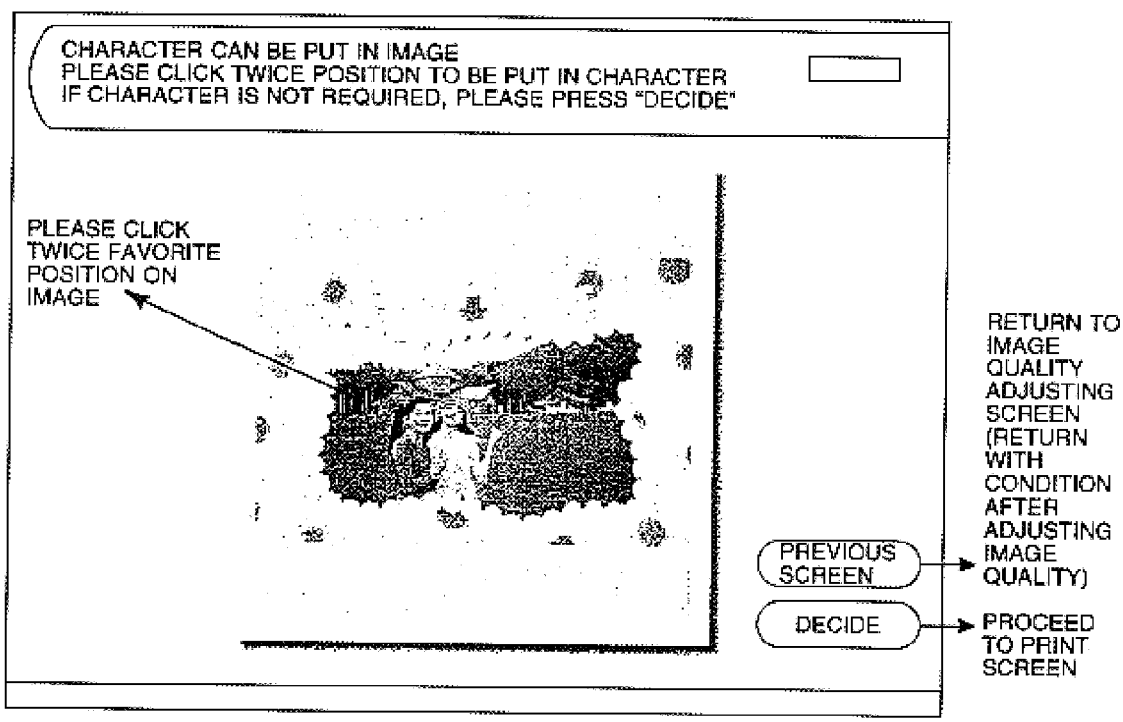
FIG. 35 is a drawing showing a screen on the monitor display provided in this image processing system, and is a drawing showing the screen for receiving a letter input.

FIG. 35 is a drawing showing a screen of the monitor display provided in an image processing apparatus of this embodiment and is a drawing showing the screen for receiving letter input. To explain the detail of the operation, by clicking twice on the position in which he wishes to inlay a letter, the dialogue screen for inputting a letter appears, and he can input a letter by using this.

Figure 36:
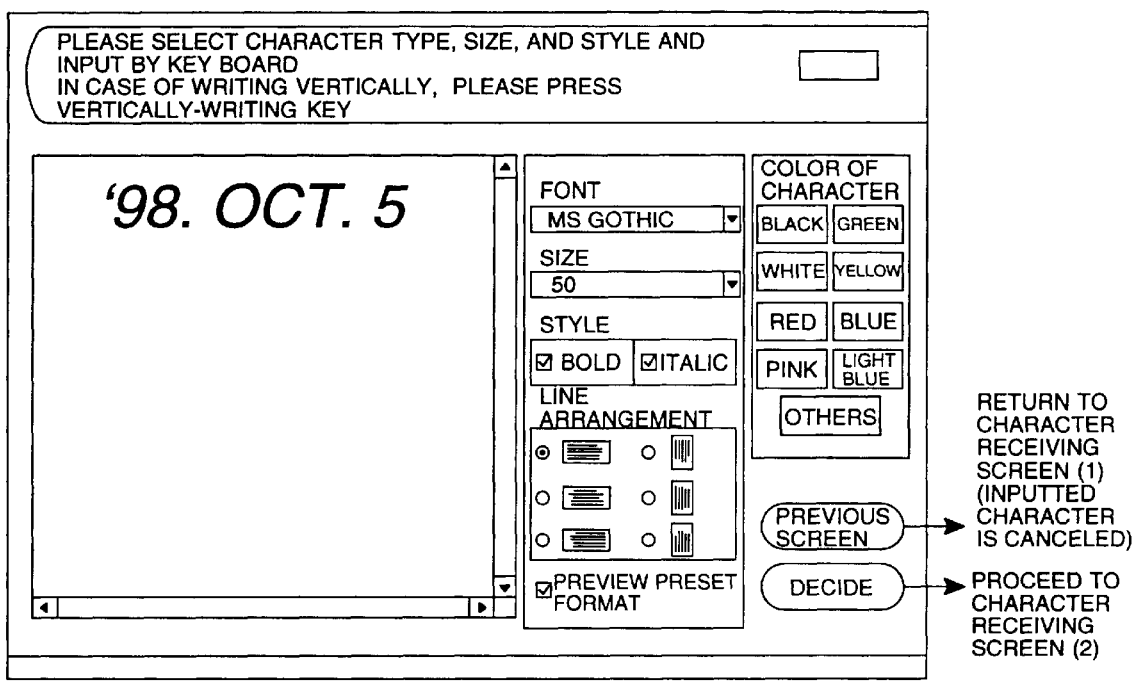
FIG. 36 is a drawing showing a screen on the monitor display provided in this image processing system, and is a drawing showing the dialogue screen for a letter input.

FIG. 36 is a drawing showing a screen of the monitor display provided in an image processing apparatus of this embodiment and is a drawing showing the dialogue screen for inputting a letter. To explain the detail of the operation, on this screen, an operator can input a letter of the font, the size, the style, and the color which he wishes to use.

The explanation of the function of every button is as follows:

"font": an operator can select one of general fonts in 'Windows';
(As for the kind of fonts, it can be increased by using a font collection on the market etc.)
"style": either of bald and italic can be selected;
"color": in addition to eight colors (black, white, red, pink, green, yellow, blue, and light blue), one color desired can be registered; (Other registered colors also can be varied as the occasion may demand.)

"line arrangement": any one of three arrangements, and either of vertical writing and lateral writing can be selected;

"preview": the inputted letters are previewed in the state of the size, the font, the style, and the color of letters as they are set;

"previous screen": an operator can return to the screen for receiving letter input (FIG. 35); (The inputted letters are cancelled.); and "decide": an operator can proceed to the screen for receiving letter input (2) (FIG. 37).

Figure 37:
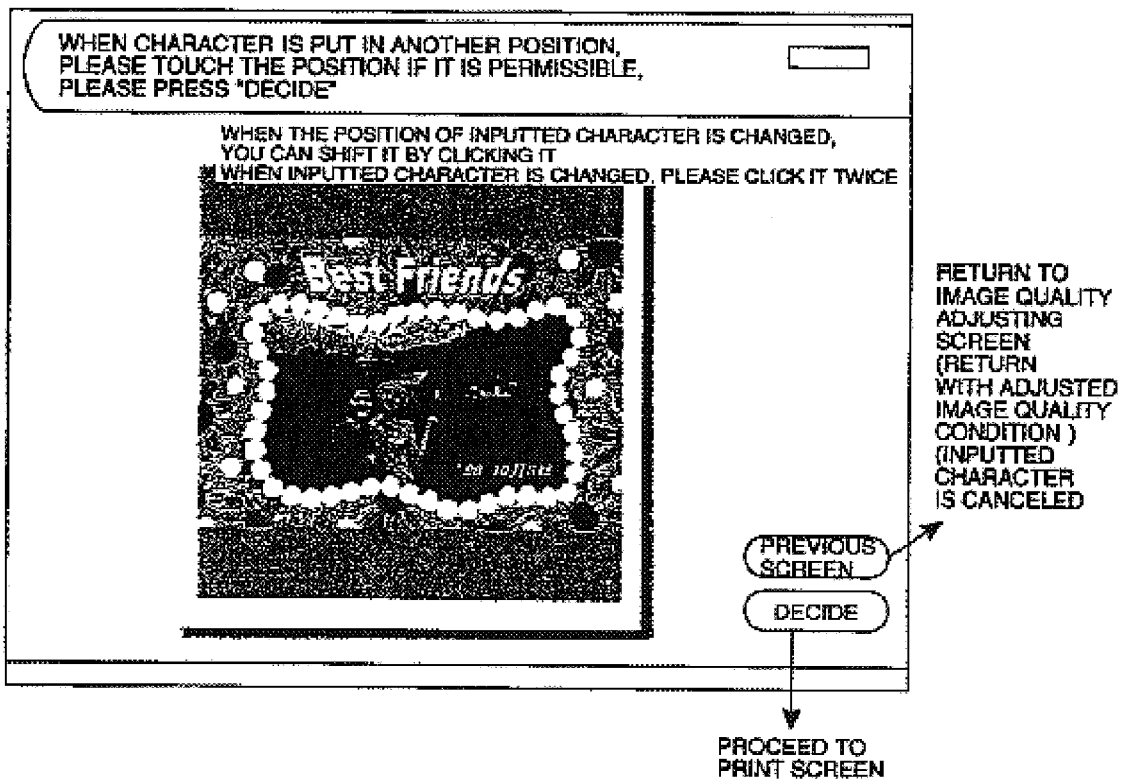
FIG. 37 is a drawing showing a screen on the monitor display provided in this image processing system, and is a drawing showing the screen for receiving a letter input.

FIG. 37 is a drawing showing a screen of the monitor display provided in an image processing apparatus of this embodiment and is a drawing showing the screen for receiving letter input. To explain the detail of the operation, on the screen, an operator can further input a letter in an another position. In this case, the operator should click twice on the position on the image in which he wishes to inlay a letter. On the other hand, if an operator wishes to change the position of an inputted letter, by clicking on the inputted letter, he can move (drag) the letter. Further, if an operator wishes to alter or to change over an inputted letter (the size and the color of the letter, contents of the inputted letter(s), etc.), by clicking twice on the inputted letter(s), he can return to the dialogue for inputting a letter.

Figure 38:
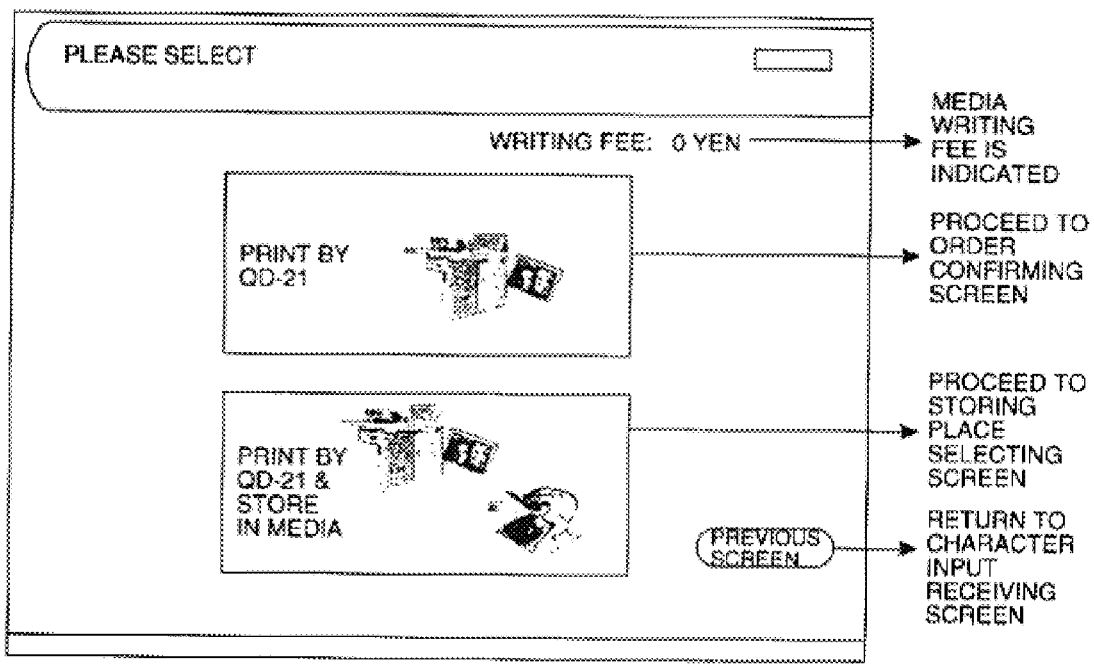
FIG. 38 is a drawing showing a screen on the monitor display provided in this image processing system, and is a drawing showing the screen for printing.

FIG. 38 is a drawing showing a screen of the monitor display provided in an image processing apparatus of this embodiment and is a drawing showing the screen for printing. To explain the detail of the operation, on the screen, an operator can select either of the two services "print by QD-21" and "print by QD-21 and store the prepared image in a medium".

The explanation of the function of every button is as follows:

"previous screen": an operator can return to the screen for receiving letter input (with the letters which have been inputted by the screen for inputting a letter stored);

"interrupt operation": the dialogue for interrupting an operation will be indicated, and if an operator selects "interrupt", the state becomes the same as that when the "interrupt operation" is selected on the screen for obtaining an input image, and the operator can move to the screen for selecting a service category.

Figure 39:
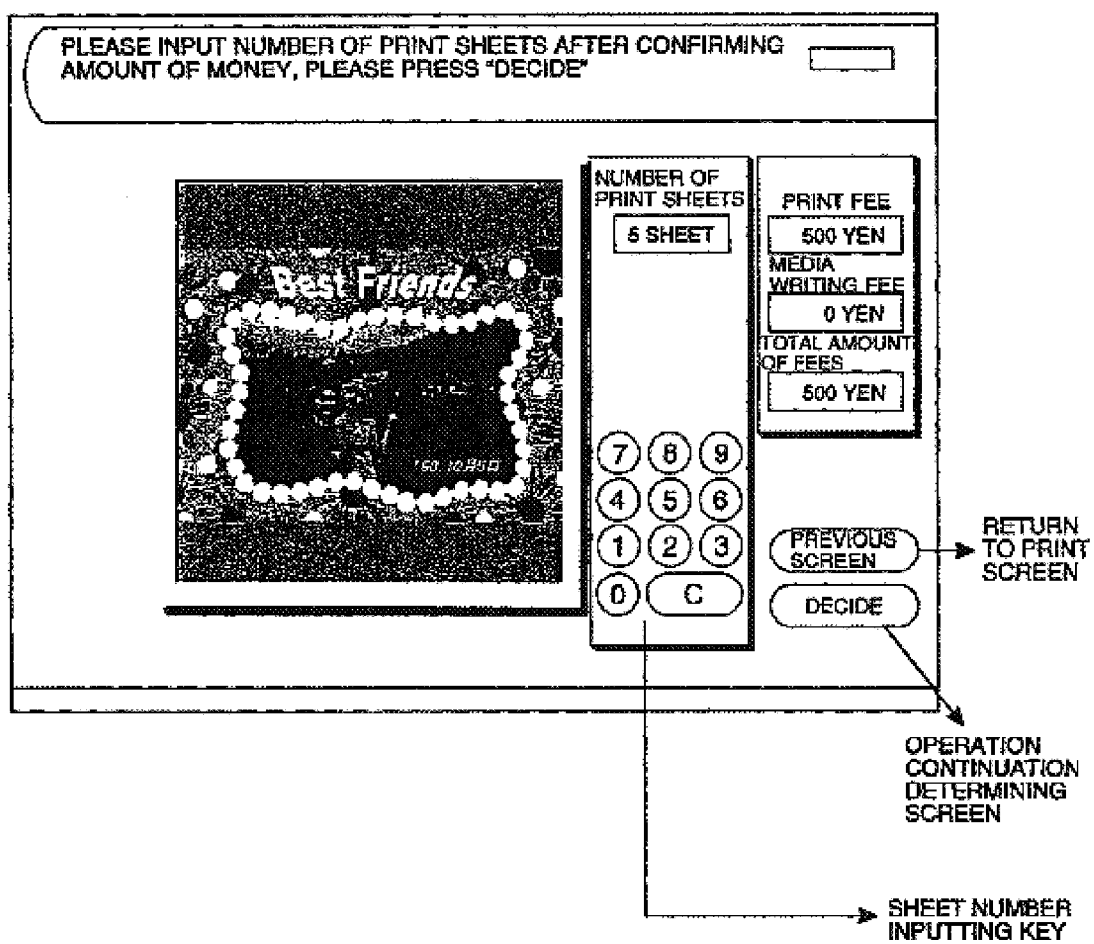
FIG. 39 is a drawing showing a screen on the monitor display provided in this image processing system, and is a drawing showing the screen for confirming an order.

FIG. 39 is a drawing showing a screen of the monitor display provided in an image processing apparatus of this embodiment and is a drawing showing the screen for confirming the order. To explain the detail of the operation, by inputting the number of prints, the amount of charge is indicated. An operator should press the "decide" button after he has inputted the number of prints.

The explanation of the function of every button is as follows:

"previous screen": an operator can return to the screen for printing; and

"decide": the number of prints is inputted and an operator can proceed to the screen for continuing the operation.

Figure 40:
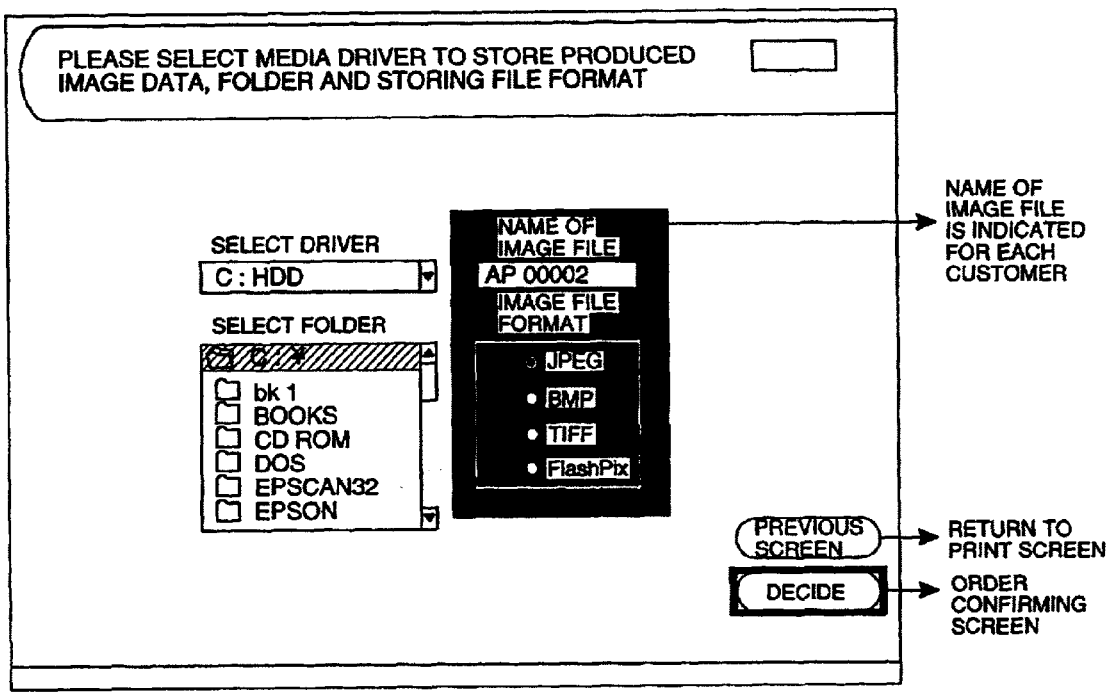
FIG. 40 is a drawing showing a screen on the monitor display provided in this image processing system, and is a drawing showing the screen for selecting a storing place.

FIG. 40 is a drawing showing a screen of the monitor display provided in an image processing apparatus of this embodiment and is a drawing showing the screen for selecting a storing place. To explain the detail of the operation, an operator can select a place for storing a prepared image (a drive, a folder) and a format of a graphics file for storing. After selecting, the operator should press the "decide" button.

The explanation of the function of every button is as follows:

"previous screen": an operator can return to the screen for printing; and

Figure 41:
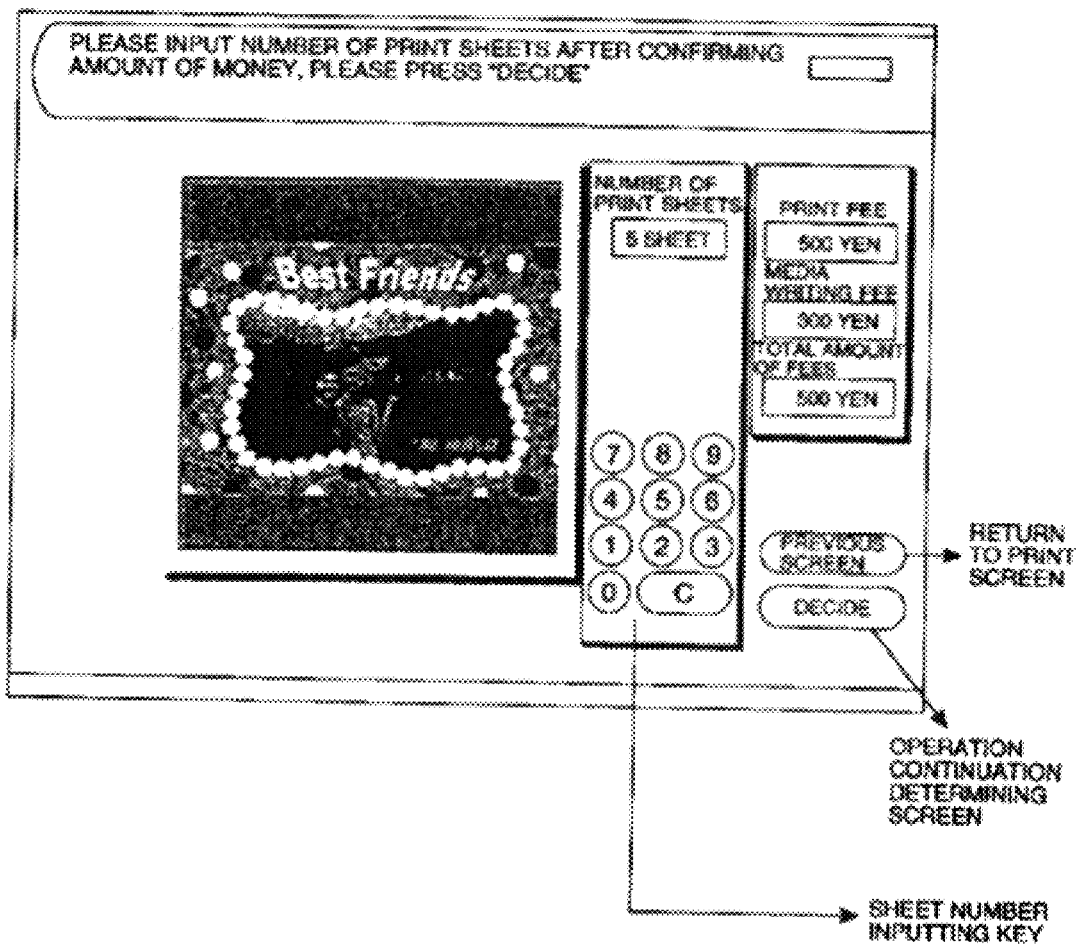
FIG. 41 is a drawing showing a screen on the monitor display provided in this image processing system, and is a drawing showing the screen for confirming an order.

"decide": an operator proceeds to the screen for confirming the order (FIG. 41).

FIG. 41 is a drawing showing a screen of the monitor display provided in an image processing apparatus of this embodiment and is a drawing showing the screen for confirming the order. To explain the detail of the operation, by inputting the number of prints, the amount of charge is indicated. An operator should press the "decide" button after he has inputted the number of prints.

The explanation of the function of every button is as follows:

"previous screen": "can not return to the previous screen" is indicated; an operator can not return to the previous screen, because the operation for storing the image in a medium is finished; and "decide": the number of prints is inputted, and an operator proceeds to the screen for determining to continue the operation.

Figure 42:
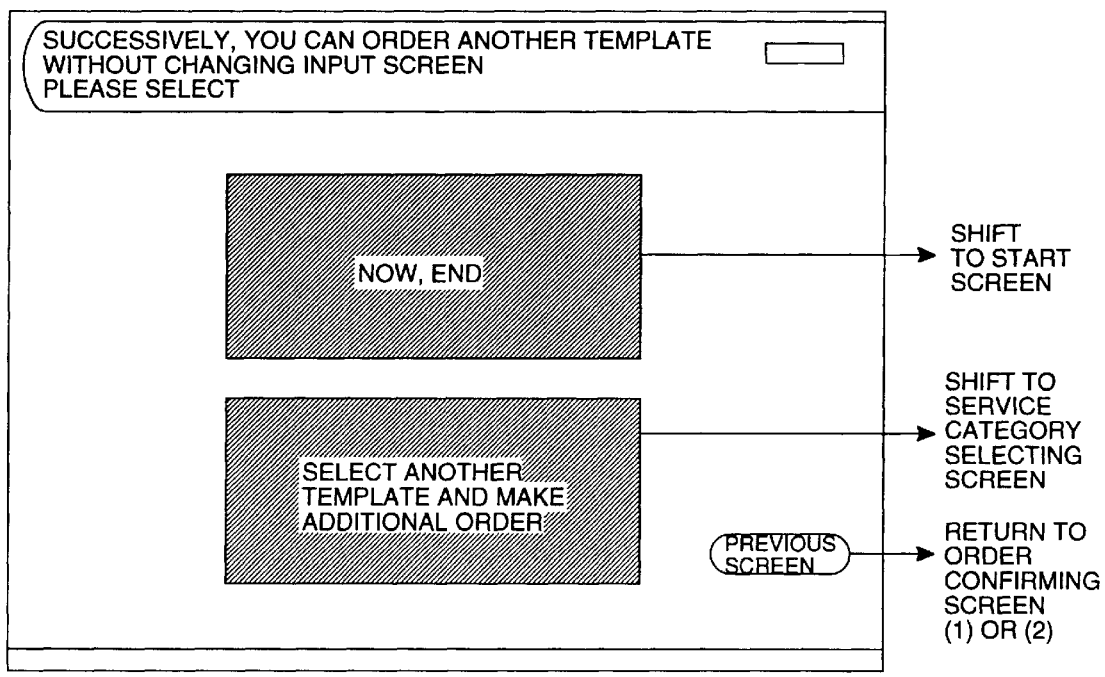
FIG. 42 is a drawing showing a screen on the monitor display provided in this image processing system, and is a drawing showing the screen for determining the continuation of an operation.

FIG. 42 is a drawing showing a screen of the monitor display provided in an image processing apparatus of this embodiment and is a drawing showing the screen for determining to continue the operation. To explain the detail of the operation, an operator can select either of "this completes the operation" and "select another template to order additionally". If "this completes the operation" is selected, printing the prepared image in QD-21 is started for the number of prints designated. If "select another template to order additionally" is selected, an operator can make an additional order with the another template, using the image which have been inputted for inlay as it is.

The explanation of the function of the button is as follows:

"previous screen": in the case where he has selected "print in QD-21", an operator can return to the screen for confirming the order (FIG. 39); in the case where he has selected "print in QD-21 and store the image in a medium", he can return to the screen for confirming the order (FIG. 41).

Figure 43:
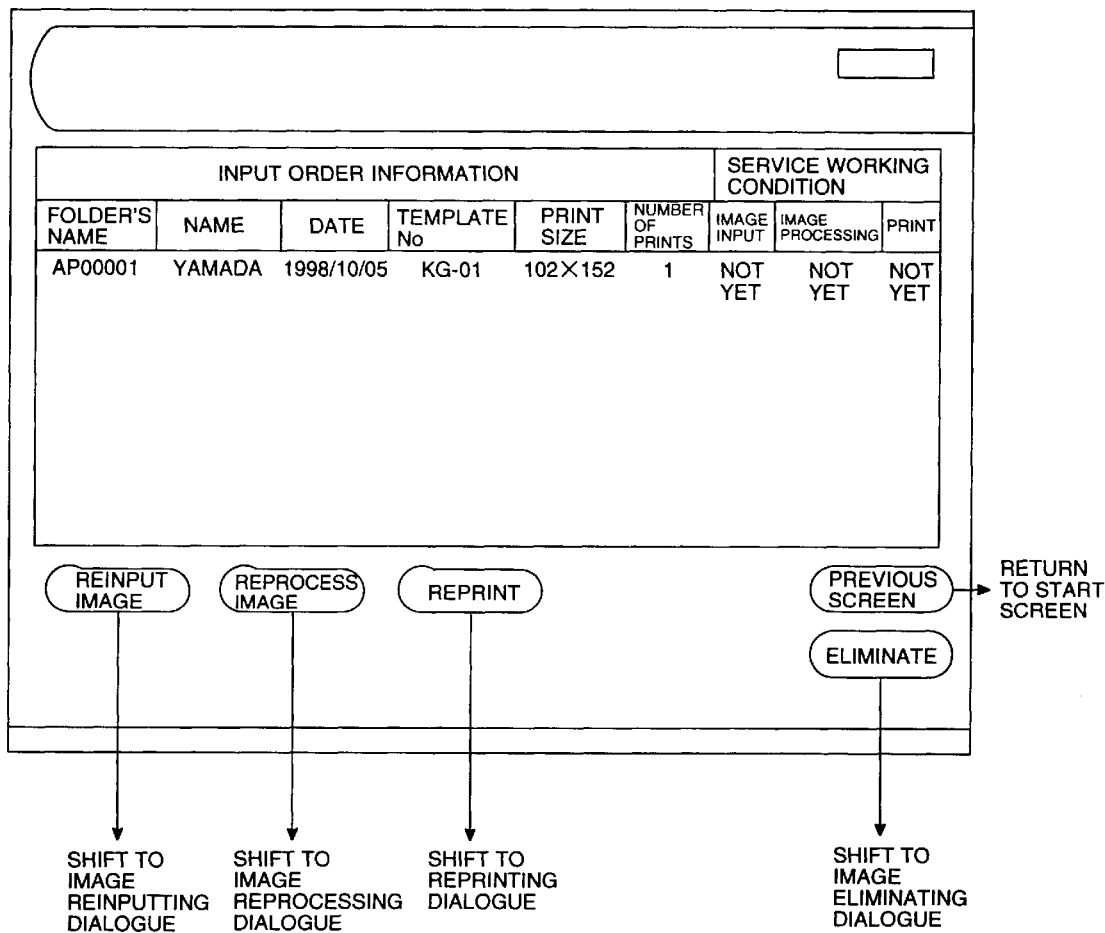
FIG. 43 is a drawing showing a screen on the monitor display provided in this image processing system, and is a drawing showing the screen for controlling orders.

FIG. 43 is a drawing showing a screen of the monitor display provided in an image processing apparatus of this embodiment and is a drawing showing the screen for controlling orders. To explain the detail of the operation, on the screen, several bits of information on customers from each of whom an order is received (the name of the folder which is generated automatically, the name of the customer, date, the template No., the print size, and the number of prints) are indicated, and the situations of the working for each of the customer orders are also indicated.

Because the data of an image which a customer has formed is kept stored in the HD of the EXPC, for the orders for which all the stages of processing (inputting the image, processing of the image, and printing) have been finished, after designating the order, the image data in the HD should be eliminated by pressing the "eliminate" key (if data of a large number of orders are stored, the HD becomes full). Further, by pressing the button "re-process the image" after designating the order of a customer, only processing the image can be done over again (varying the color, changing over the inlaid letters, changing the template) with the inputted image is kept as it is. In addition to that, by pressing the button "re-print" after designating the order of a customer, the number of prints of an already prepared image can be inputted over again.

FIG. 44 is a drawing showing a screen of the monitor display provided in an image processing apparatus of this embodiment and is a drawing showing the dialogue screen for re-inputting an image. To explain the detail of the operation, by selecting "Yes", an operator can return to the screen for selecting a service category.

FIG. 45 is a drawing showing a screen of the monitor display provided in an image processing apparatus of this embodiment and is a drawing showing the dialogue screen for re-processing an image. To explain the detail of the operation, by selecting "Yes", an operator can return to the screen for reading an image to be inlaid.

FIG. 46 is a drawing showing a screen of the monitor display provided in an image processing apparatus of this embodiment and is a drawing showing the dialogue screen for re-printing. To explain the detail of the operation, by selecting "Yes", an operator can return to the screen for printing.

FIG. 47 is a drawing showing a screen of the monitor display provided in an image processing apparatus of this embodiment and is a drawing showing the dialogue screen for re-printing. To explain the detail of the operation, by selecting "Yes", all the data of the designated customer are eliminated.

Up to now, this invention has been explained with reference to the embodiments; however, this invention should not be construed as limited to the above-described embodiments, and it is a matter of course that it can be suitably altered and/or improved. For example, an image to be read by an image processing apparatus of this embodiment is not limited to a negative-film, and it may be an image recorded on a positive-film or an image printed on a sheet of paper. Further, it may be also possible to make a print by inputting image data of a digital still camera etc. directly into the image processing apparatus to make a print.

According to the photographic print producing system of this invention, because it comprises a correlating device for correlating the inputted image data and the print-producing information for producing a photographic print on the basis of said inputted image data to be corresponding to each other, and a photographic print producing apparatus for producing a photographic print on the basis of said image data and said print-producing information for producing a photographic print on the basis of said image data, both of which are made to be corresponding to each other by said correlating device, and further comprises at least one correlating device to which print-producing information for producing a photographic print of a different kind of an order from the above-mentioned correlating device is inputted, in the case where a plurality of kinds of print-producing information are provided, if one correlating device is let to make the image data and one kind of print-producing information to be corresponding to each other, in order that an image may be printed, for example, as it is without processing the image data, and the other correlating device is let to make the image data and another kind of print-producing information to be corresponding to each other, in order that an image may be printed on the basis of the processed image data, then it is possible to print images rapidly and simply using the one correlating device and it is also possible to print images of various kinds of modes by using the other correlating device.

According to the photographic print producing system of this invention, because it comprises a printer for producing a photographic print, a first input means for inputting first image data information and first service-related information to said printer, and a second input means for inputting second image data information and second service-related information which is different from said first service-related information to said printer, it is possible that said printer is let to print an image, for example, as it is without processing the image data in response to the input from the first input means, and said printer is let to print an image on the basis of the processed image data in response to the input from the second input means; owing to this, it is possible to use suitably either the first or the second input means on demand for producing prints rapidly and simply or for producing prints of various kinds of modes.

What is claimed is:

1. A print system, comprising:

a printer;

a first inputting device to input image data and first print service dealing information into the printer;

a second inputting device to input image data and second print service dealing information different from the first print service dealing information into the printer; and an image inputting device to input image data to at least one of the first inputting device and the second inputting device;

wherein the image data inputted into the printer by the first inputting device are the image data inputted by the image inputting device, and the image data inputted into the printer by the second inputting device are obtained by processing the image data inputted by the image inputting device; and wherein the printer produces a print based on an input from the first inputting device or the second inputting device.

2. The print system of claim 1, wherein the printer produces the print based on the image data and the first print service dealing information inputted from the first inputting device or the image data and the second print service dealing information inputted from the second inputting device.

3. The print system of claim 1, wherein the image data inputted from the first inputting device into the printer is different from the image data inputted from the second inputting device into the printer.

4. The print system of claim 1, wherein the first inputting device correlates the image data with the first print service dealing information and inputs the image data and the first print service dealing information both correlated with each other into the printer and the second inputting device correlates the image data with the second print service dealing information and inputs the image data and the second print service dealing information both correlated with each other into the printer.

5. The print system of claim 1, wherein a time period to input the first print service dealing information is shorter than a time period to input the second print service dealing information.

6. The print system of claim 1, further comprising:

a first image inputting device to input image data to the first inputting device, and a second image inputting device to input image data to the second inputting device, wherein the image data inputted into the printer by the first inputting device are the image data inputted by the first image inputting device and the image data inputted into the printer by the second inputting device is obtained by processing the image data inputted by the second image inputting device.

7. The print system of claim 1, wherein the image data inputted into the printer by the second inputting device includes image data processed so as to be used for one of a calendar, a visiting card, a composite photograph, and a certificate photograph.

8. The print system of claim 6, wherein the image data inputted into the printer by the second inputting device includes image data processed so as to be used for one of a calendar, a visiting card and a certificate photograph.

9. The print system of claim 1, wherein the first print service dealing information consists of only a requested number of prints and a print size.

10. The print system of claim 1, wherein the print system produces prints in response to plural kinds of print service orders.

11. The print system of claim 10, wherein the first inputting device correlates the image data with the first print service dealing information and inputs the image data and the first print service dealing information both correlated with each other into the printer and the second inputting device correlates the image data with the second print service dealing information and inputs the image data and the second print service dealing information both correlated with each other into the printer, and wherein the second print service dealing information correlated with the image data by the second inputting device is used to produce a different kind of a print from a print produced by the printer in accordance with the image data and the first print service dealing information correlated by the first inputting device.

12. The print system of claim 11, wherein the plural kinds of print service orders include an order for a simultaneous printing.

13. The print system of claim 11, wherein the plural kinds of print service orders include an order to conduct an image processing to process the inputted image data.

14. The print system of claim 11, wherein the plural kinds of print service orders include an order to produce a print for a calendar.

15. The print system of claim 11, wherein the plural kinds of print service orders include an order to produce a print for a visiting card.

16. The print system of claim 11, wherein the plural kinds of print service orders include an order to produce a print for a certificate photograph.

* * * * *